(12) United States Patent
Snydacker

(10) Patent No.: US 11,253,848 B2
(45) Date of Patent: Feb. 22, 2022

(54) LITHIUM EXTRACTION WITH POROUS ION EXCHANGE BEADS

(71) Applicant: LILAC SOLUTIONS, INC., Middletown, RI (US)

(72) Inventor: David Henry Snydacker, San Francisco, CA (US)

(73) Assignee: LILAC SOLUTIONS, INC., Middletown, RI (US)

( * ) Notice: Subject to any disclaimer, the term of this patent is extended or adjusted under 35 U.S.C. 154(b) by 0 days.

(21) Appl. No.: 16/634,503

(22) PCT Filed: Aug. 1, 2018

(86) PCT No.: PCT/US2018/044821
§ 371 (c)(1),
(2) Date: Jan. 27, 2020

(87) PCT Pub. No.: WO2019/028148
PCT Pub. Date: Feb. 7, 2019

(65) Prior Publication Data
US 2020/0230591 A1 Jul. 23, 2020

Related U.S. Application Data

(60) Provisional application No. 62/540,497, filed on Aug. 2, 2017.

(51) Int. Cl.
*B01J 47/016* (2017.01)
*B01J 47/018* (2017.01)
*B01D 15/36* (2006.01)
*B01D 39/06* (2006.01)

(52) U.S. Cl.
CPC .......... *B01J 47/016* (2017.01); *B01D 15/361* (2013.01); *B01D 39/06* (2013.01); *B01J 47/018* (2017.01)

(58) Field of Classification Search
CPC ..... B01J 47/016; B01J 47/018; B01D 15/361; B01D 39/06
USPC .......................................................... 521/28
See application file for complete search history.

(56) References Cited

U.S. PATENT DOCUMENTS

| 3,793,433 | A | 2/1974 | Seeley et al. | |
|---|---|---|---|---|
| 4,116,858 | A | 9/1978 | Lee et al. | |
| 4,159,311 | A | 6/1979 | Bauman et al. | |
| 4,382,124 | A † | 5/1983 | Meitzner | |
| 4,747,949 | A * | 5/1988 | Barkey | B01J 47/016 210/638 |
| 5,039,382 | A | 8/1991 | Suzuki et al. | |
| 5,639,861 | A † | 6/1997 | Steffier | |
| 6,171,489 | B1 † | 1/2001 | Ballard | |
| 7,435,477 | B2 | 10/2008 | Adachi et al. | |
| 7,541,016 | B2 | 6/2009 | Gorshkov et al. | |
| 7,820,327 | B2 | 10/2010 | Yumoto et al. | |
| 8,454,816 | B1 | 6/2013 | Harrison et al. | |
| 8,506,851 | B2* | 8/2013 | Ravet | H01M 4/485 252/521.5 |
| 8,679,224 | B2 | 3/2014 | Brown et al. | |
| 8,741,150 | B2 | 6/2014 | Chung et al. | |
| 8,778,289 | B2 | 7/2014 | Chon et al. | |
| 9,034,294 | B1 | 5/2015 | Harrison | |
| 9,677,181 | B2 | 6/2017 | Bourassa et al. | |
| 10,150,056 | B2 | 12/2018 | Snydacker | |
| 10,439,200 | B2 | 10/2019 | Snydacker et al. | |
| 10,505,178 | B2 | 12/2019 | Snydacker et al. | |
| 2004/0005267 | A1 | 1/2004 | Boryta et al. | |
| 2007/0138020 | A1 | 6/2007 | Balagopal et al. | |
| 2010/0116748 | A1* | 5/2010 | Rasmussen | C08F 222/385 210/683 |
| 2011/0044882 | A1 | 2/2011 | Buckley et al. | |
| 2011/0067230 | A1 | 3/2011 | Tan et al. | |
| 2011/0174739 | A1 | 7/2011 | Chung et al. | |
| 2013/0001168 | A1 | 1/2013 | Kim et al. | |
| 2013/0306565 | A1 | 11/2013 | Davis | |
| 2014/0113197 | A1 | 4/2014 | Xiao et al. | |
| 2014/0239221 | A1 | 8/2014 | Harrison et al. | |
| 2015/0013499 | A1 | 1/2015 | Asano et al. | |
| 2015/0083667 | A1 | 3/2015 | Stouffer | |
| 2015/0152523 | A1 | 6/2015 | Sharma | |
| 2015/0197830 | A1 | 7/2015 | Chon et al. | |
| 2015/0203542 | A1 | 7/2015 | Bagnoli et al. | |
| 2016/0115040 | A1 | 4/2016 | Yi et al. | |
| 2016/0230250 | A1 | 8/2016 | Chung et al. | |
| 2017/0022617 | A1 | 1/2017 | Magnan et al. | |
| 2017/0028395 | A1 | 2/2017 | Bewsey | |
| 2017/0189855 | A1* | 7/2017 | Xiang | C04B 26/26 |
| 2017/0217796 | A1 | 8/2017 | Snydacker et al. | |
| 2018/0016153 | A1 | 1/2018 | Sharma | |
| 2018/0080133 | A1 | 3/2018 | Smith et al. | |
| 2018/0133619 | A1 | 5/2018 | Snydacker | |
| 2018/0245180 | A1 | 8/2018 | Cheng et al. | |
| 2019/0046898 | A1 | 2/2019 | Snydacker | |
| 2019/0256987 | A1 | 8/2019 | Snydacker et al. | |
| 2019/0276327 | A1* | 9/2019 | Brown | C01D 15/04 |
| 2020/0165699 | A1 | 5/2020 | Snydacker et al. | |
| 2020/0232105 | A1 | 7/2020 | Snydacker et al. | |
| 2021/0077990 | A1 | 3/2021 | Snydacker et al. | |

FOREIGN PATENT DOCUMENTS

| CN | 101961634 A | 2/2011 |
|---|---|---|
| CN | 102872792 A | 1/2013 |
| CN | 103794779 A | 5/2014 |
| CN | 105238927 A | 1/2016 |
| CN | 105251436 A | 1/2016 |
| CN | 105289455 A | 2/2016 |
| CN | 106311190 A | 1/2017 |

(Continued)

OTHER PUBLICATIONS

Umeno et al. Preparation and Adsorptive Properties of Membrane-Type Adsorbents for Lithium Recovery from Seawater. Ind Eng Chem Res 41 (17):4281-4287 (2002).

(Continued)

*Primary Examiner* — Michael M. Bernshteyn
(74) *Attorney, Agent, or Firm* — Wilson Sonsini Goodrich & Rosati

(57) ABSTRACT

The present invention relates to the extraction of lithium from liquid resources such as natural and synthetic brines, leachate solutions from minerals, and recycled products.

18 Claims, 4 Drawing Sheets

(56) References Cited

FOREIGN PATENT DOCUMENTS

| | | | |
|---|---|---|---|
| EP | 2945211 B1 | 11/2018 | |
| FR | 3034781 A1 | 10/2016 | |
| JP | H08236114 A | 9/1996 | |
| JP | 2003500318 A | 1/2003 | |
| JP | 2005296811 A | 10/2005 | |
| JP | 2009507839 A | 2/2009 | |
| JP | 2010-42395 A | † | 2/2010 |
| JP | 2010042395 A | 2/2010 | |
| JP | 2015020090 A | 2/2015 | |
| JP | 5898021 B2 | 4/2016 | |
| JP | 2019099874 A | 6/2019 | |
| KR | 20120063424 A | 6/2012 | |
| KR | 20140082065 A | 7/2014 | |
| WO | WO-2010056322 A1 | 5/2010 | |
| WO | WO-2012005545 A2 | 1/2012 | |
| WO | WO-2015171109 A1 | 11/2015 | |
| WO | WO-2016064689 A2 | 4/2016 | |
| WO | WO-2016172017 A1 | 10/2016 | |
| WO | WO-2017005113 A1 | 1/2017 | |
| WO | WO-2017020090 A1 | 2/2017 | |
| WO | WO-2017137885 A1 | 8/2017 | |
| WO | WO-2018089932 A1 | 5/2018 | |
| WO | WO-2019000095 A1 | 1/2019 | |
| WO | WO-2019028148 A1 | 2/2019 | |
| WO | WO-2019028174 A2 | 2/2019 | |
| WO | WO-2019126862 A1 | 7/2019 | |
| WO | WO-2019160982 A1 | 8/2019 | |
| WO | WO-2019168941 A1 | 9/2019 | |

OTHER PUBLICATIONS

Chitrakar et al. Lithium recovery from salt lake brine by H2TiO3. Dalton Trans 43:8933-8939 (2014).

Chitrakar et al. Selective Uptake of Lithium Ion from Brine by H1.33Mn1.67O4 and H1.6Mn1.6O4. Chem Lett 41:1647-1649 (2012).

Cho et al. High-Performance ZrO2-Coated LiNiO2 Cathode Material. Electrochem Solid-State Lett 4(10):A159-A161 (2001).

Department of Energy. Ion Exchange Materials for Lithium Extraction (Topic: 15, Subtopic:e)—Abstract. Available at https://www.sbir.gov/sbirsearch/detail/1307793 (3 pgs.) (2017).

Larumbe et al. Effect of a SiO2 coating on the magnetic properties of Fe3O4 nanoparticles. JPhys: Condens Matter 24(26):266007 (2012).

Nishihama et al. Selective recovery process of lithium from seawater using integrated ion exchange methods. Solvent Extraction and Ion Exchange 29:421-431 (2011).

Oh et al. Double Carbon Coating of LiFePO4 as High Rate Electrode for Rechargeable Lithium Batteries. Adv. Mater. 22:4842-4845 (2010).

Pareja et al. Corrosion behaviour of zirconia barrier coatings on galvanized steel. Surface and Coatings Technology 200(22-23):6606-6610 (2006).

Patel et al. Ionic and electronic conductivities of atomic layer deposition thin film coated lithium ion battery cathode particles. RSC Advances 6:98768-98776 (2016).

PCT/US2017/061384 International Search Report and Written Opinion dated Feb. 14, 2018.

PCT/US2018/044821 International Search Report and Written Opinion dated Oct. 12, 2018.

PCT/US2018/044868 International Search Report and Written Opinion dated Mar. 6, 2019.

PCT/US2019/017885 International Search Report and Written Opinion dated Jun. 14, 2019.

PCT/US2019/019780 International Search Report and Written Opinion dated Jun. 14, 2019.

Tarakina et al. Defect crystal structure of new TiO(OH)2 hydroxide and related lithium salt Li2TiO3. Dalton Trans 39:8168-8176 (2010).

U.S. Appl. No. 15/811,415 Office Action dated May 24, 2018.

U.S. Appl. No. 16/052,381 Office Action dated Nov. 1, 2018.

U.S. Appl. No. 16/366,697 Office Action dated Jun. 6, 2019.

U.S. Appl. No. 16/366,697 Office Action dated Sep. 17, 2019.

Co-pending U.S. Appl. No. 17/169,251, inventor Snydacker; David Henry, filed Feb. 5, 2021.

PCT/US2021/012534 International Search Report and Written Opinion dated Apr. 27, 2021.

Xiao et al. Lithium ion recovery from brine using granulated polyacrylamide-MnO 2 ion-sieve. Chemical Engineering Journal 279:659-666 (2015).

Zandvakili et al. Preparation and characterisation of lithium ion exchange composite for the recovery of lithium from brine. Mineral Processing and Extractive Metallurgy 127(3):176-181 (2017).

Co-pending U.S. Appl. No. 17/364,530, inventor Snydacker; David Henry, filed May 30, 2021.

Miyai et al. Bench scale studies on lithium recovery from sea water. Nippon Kaisui Gakkai-Shi -Bulletin Of The Society Of Sea Waterscience, Japan 49(4):226-230 (1995) (English Abstract).

Xiao et al. Adsorption and desorption behavior of lithium ion in spherical PVC-MnO2 ion sieve. Industrial & engineering chemistry research, 51 (33):10921-10929 (2012).

PCT/US2021/036227 International Search Report and Written Opinion dated Nov. 2, 2021.

\* cited by examiner

† cited by third party

LITHIUM EXTRACTION WITH POROUS ION EXCHANGE BEADS

CROSS-REFERENCE

This application claims the benefit of U.S. Provisional Application No. 62/540,497, filed Aug. 2, 2017, which application is incorporated herein by reference in its entirety.

BACKGROUND OF THE INVENTION

Lithium is an essential element for high-energy rechargeable batteries and other technologies. Lithium can be found in a variety of liquid solutions, including natural and synthetic brines and leachate solutions from minerals and recycled products.

SUMMARY OF THE INVENTION

Lithium can be extracted from liquid resources using an ion exchange process based on inorganic ion exchange materials. Inorganic ion exchange materials absorb lithium ions from a liquid resource while releasing hydrogen ions, and then elute lithium ions in acid while absorbing hydrogen ions. The ion exchange process can be repeated to extract lithium ions from a liquid resource and yield a concentrated lithium ion solution. The concentrated lithium ion solution can be further processed into chemicals for the battery industry or other industries.

An aspect described herein is a method of making porous ion exchange beads, comprising: combining and mixing ion exchange particles that reversibly exchange lithium and hydrogen, a matrix material, and a filler material to make a mixture; forming the mixture into beads; optionally heating the beads; and removing a portion or essentially all of the filler material to make porous ion exchange beads. In some embodiments, the combining and mixing are done using dry powders. In some embodiments, the combining and mixing are done using one or more solvents and the mixture is a slurry. In some embodiments, the forming is done using a mechanical press. In some embodiments, the forming is done by injecting the slurry into a liquid. In some embodiments, the heating is sufficient to melt or sinter the matrix material. In some embodiments, the removing is done by dissolving the filler material using water, an aqueous solution, an acid, a brine, an alcohol, or combinations thereof. In some embodiments, the removing is done by heating the beads sufficient to decompose the filler material to gaseous particles or decomposition products.

An aspect described herein is a method of making a porous ion exchange bead for extraction of lithium from a liquid resource comprising: forming a precursor bead wherein the precursor bead comprises an ion exchange material, a matrix material and a filler material; and removing at least a portion of the filler material to produce the porous ion exchange bead. In some embodiments, essentially all of the filler material is removed.

In some embodiments, the ion exchange material is selected from coated ion exchange particles, uncoated ion exchange particles, and combinations thereof. In some embodiments, the coated ion exchange particles comprise an ion exchange material and a coating material.

In some embodiments, the coating material of the coated ion exchange particles comprises a carbide, a nitride, an oxide, a phosphate, a fluoride, a polymer, carbon, a carbonaceous material, or combinations thereof. In some embodiments, the coating material of the coated ion exchange particles is selected from the group consisting of $TiO_2$, $ZrO_2$, $MoO_2$, $SnO_2$, $Nb_2O_5$, $Ta_2O_5$, $SiO_2$, $Li_2TiO_3$, $Li_2ZrO_3$, $Li_2SiO_3$, $Li_2MnO_3$, $Li_2MoO_3$, $LiNbO_3$, $LiTaO_3$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, and combinations thereof. In some embodiments, the coating material of the coated ion exchange particles is selected from the group consisting of polyethylene, low density polyethylene, high density polyethylene, polypropylene, polyphenylene sulfide, polyester, polytetrafluoroethylene, types of polyamide, polyether ether ketone, polysulfone, polyvinylidene difluoride, poly (4-vinyl pyridine-co-styrene), polystyrene, polybutadiene, acrylonitrile butadiene styrene, polyvinyl chloride, polyvinylidene dichloride, ethylene tetrafluoroethylene polymer, poly(chlorotrifluoroethylene), ethylene chlorotrifluoro ethylene, polyvinyl fluoride, fluorinated ethylene-propylene, perfluorinated elastomer, chlorotrifluoroethylenevinylidene fluoride, perfluoropolyether, perfluorosulfonic acid, polyethylene oxide, polyethylene glycol, sodium polyacrylate, polyethylene-block-poly(ethylene glycol), polyacrylonitrile, polychloroprene (neoprene), polyvinyl butyral, expanded polystyrene, polydivinylbenzene, tetrafluoroethylene-perfluoro-3,6-dioxa-4-methyl-7-octenesulfonic acid copolymer, copolymers thereof, and combinations thereof.

In some embodiments, the ion exchange material of the coated ion exchange particles comprises an oxide, a phosphate, an oxyfluoride, a fluorophosphate, or combinations thereof. In some embodiments, the ion exchange material of the coated ion exchange particles is selected from the group consisting of $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl \cdot xAl(OH)_3 \cdot yH_2O$, $SnO_2 \cdot xSb_2O_5 \cdot yH_2O$, $TiO_2 \cdot xSb_2O_5 \cdot yH_2O$, solid solutions thereof, and combinations thereof; wherein x is from 0.1-10; and y is from 0.1-10.

In some embodiments, the uncoated ion exchange particles comprise an ion exchange material. In some embodiments, the ion exchange material of the uncoated ion exchange particles comprises an oxide, a phosphate, an oxyfluoride, a fluorophosphate, or combinations thereof. In some embodiments, the ion exchange material of the uncoated ion exchange particles is selected from the group consisting of $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl \cdot xAl(OH)_3 \cdot yH_2O$, $SnO_2 \cdot xSb_2O_5 \cdot yH_2O$, $TiO_2 \cdot xSb_2O_5 \cdot yH_2O$, solid solutions thereof, and combinations thereof; wherein x is from 0.1-10; and y is from 0.1-10.

In some embodiments, the matrix material comprises a polymer, an oxide, a phosphate, or combinations thereof. In some embodiments, the matrix material is selected from the group consisting of polyvinyl fluoride, polyvinylidene difluoride, polyvinyl chloride, polyvinylidene dichloride, polyethylene, polypropylene, polyphenylene sulfide, polytetrafluoroethylene, sulfonated polytetrafluoroethylene, polystyrene, polydivinylbenzene, polybutadiene, poly-ethylene-tetrafluoroethyelene, polyacrylonitrile, sulfonated polymer, carboxylated polymer, tetrafluoroethylene-perfluoro-3,6-dioxa-4-methyl-7-octenesulfonic acid copolymer, copolymers thereof, and combinations thereof.

In some embodiments, the filler material is a salt, a chloride salt, sodium chloride, a sulfate salt, a carbonate salt, a nitrate salt, an alkali metal salt, an alkali earth metal salt, an organic material, a polymer, an aqueous liquid, an organic liquid, a liquid mixture, or combinations thereof. In some embodiments, the filler material is removed by treating the precursor bead with a solvent. In some embodiments, the solvent dissolves the filler material in the precursor bead. In some embodiments, the solvent is selected from the group consisting of water, ethanol, iso-propyl alcohol, acetone, and combinations thereof. In some embodiments, the filler material is removed by sublimation or evaporation optionally involving subjecting the precursor bead to heat, vacuum, air, or combinations thereof. In some embodiments, the heat decomposes the filler material.

In some embodiments, the porous ion exchange bead has an average diameter of less than about 10 µm. In some embodiments, the porous ion exchange bead has an average diameter of less than about 100 µm. In some embodiments, the porous ion exchange bead has an average diameter of less than about 1000 µm. In some embodiments, the porous ion exchange bead has an average diameter of greater than about 1000 µm.

An aspect described herein is a porous ion exchange bead comprising ion exchange material and a matrix material, wherein the porous ion exchange bead is prepared by a process comprising the steps of: combining the ion exchange material and the matrix material with a filler material to produce a precursor bead; and removing the filler material.

In some embodiments, the ion exchange material is selected from coated ion exchange particles, uncoated ion exchange particles, and combinations thereof. In some embodiments, the coated ion exchange particles comprise an ion exchange material and a coating material.

In some embodiments, the coating material of the coated ion exchange particles comprises a carbide, a nitride, an oxide, a phosphate, a fluoride, a polymer, carbon, a carbonaceous material, or combinations thereof. In some embodiments, the coating material of the coated ion exchange particles is selected from the group consisting of $TiO_2$, $ZrO_2$, $MoO_2$, $SnO_2$, $Nb_2O_5$, $Ta_2O_5$, $SiO_2$, $Li_2TiO_3$, $Li_2ZrO_3$, $Li_2SiO_3$, $Li_2MnO_3$, $Li_2MoO_3$, $LiNbO_3$, $LiTaO_3$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, and combinations thereof. In some embodiments, the coating material of the coated ion exchange particles is selected from the group consisting of polyethylene, low density polyethylene, high density polyethylene, polypropylene, polyphenylene sulfide, polyester, polytetrafluoroethylene, types of polyamide, polyether ether ketone, polysulfone, polyvinylidene difluoride, poly (4-vinyl pyridine-co-styrene), polystyrene, polybutadiene, acrylonitrile butadiene styrene, polyvinyl chloride, polyvinylidene dichloride, ethylene tetrafluoroethylene polymer, poly(chlorotrifluoroethylene), ethylene chlorotrifluoro ethylene, polyvinyl fluoride, fluorinated ethylene-propylene, perfluorinated elastomer, chlorotrifluoroethylenevinylidene fluoride, perfluoropolyether, perfluorosulfonic acid, polyethylene oxide, polyethylene glycol, sodium polyacrylate, polyethylene-block-poly(ethylene glycol), polyacrylonitrile, polychloroprene (neoprene), polyvinyl butyral, expanded polystyrene, polydivinylbenzene, tetrafluoroethylene-perfluoro-3,6-dioxa-4-methyl-7-octenesulfonic acid copolymer, copolymers thereof, and combinations thereof.

In some embodiments, the ion exchange material of the coated ion exchange particles comprises an oxide, a phosphate, an oxyfluoride, a fluorophosphate, or combinations thereof. In some embodiments, the ion exchange material of the coated ion exchange particles is selected from the group consisting of $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, and combinations thereof; wherein x is from 0.1-10; and y is from 0.1-10.

In some embodiments, the uncoated ion exchange particles comprise an ion exchange material. In some embodiments, the ion exchange material of the uncoated ion exchange particles comprises an oxide, a phosphate, an oxyfluoride, a fluorophosphate, or combinations thereof. In some embodiments, the ion exchange material of the uncoated ion exchange particles is selected from the group consisting of $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, and combinations thereof; wherein x is from 0.1-10; and y is from 0.1-10

In some embodiments, the matrix material comprises a polymer, an oxide, a phosphate, or combinations thereof. In some embodiments, the matrix material is selected from the group consisting of polyvinyl fluoride, polyvinylidene difluoride, polyvinyl chloride, polyvinylidene dichloride, polyethylene, polypropylene, polyphenylene sulfide, polytetrafluoroethylene, sulfonated polytetrafluoroethylene, polystyrene, polydivinylbenzene, polybutadiene, sulfonated polymer, carboxylated polymer, poly-ethylene-tetrafluoroethyelene, polyacrylonitrile, tetrafluoroethylene-perfluoro-3,6-dioxa-4-methyl-7-octenesulfonic acid copolymer, copolymers thereof, and combinations thereof.

In some embodiments, the filler material is a salt, a chloride salt, sodium chloride, a sulfate salt, a carbonate salt, a nitrate salt, an alkali salt, an alkali earth salt, an organic material, a polymer, an aqueous liquid, an organic liquid, a liquid mixture, or combinations thereof. In some embodiments, the filler material is removed by treating the precursor bead with a solvent. In some embodiments, the solvent dissolves the filler material in the precursor bead. In some embodiments, the solvent is selected from the group consisting of water, ethanol, iso-propyl alcohol, acetone, and combinations thereof. In some embodiments, the filler material is removed by sublimation or evaporation optionally involving subjecting the precursor bead to heat, vacuum, air, or combinations thereof. In some embodiments, the heat decomposes the filler material.

An aspect described herein is a method of extracting lithium from a liquid resource, comprising: contacting the porous ion exchange bead as described herein with a liquid resource to produce a lithiated porous ion exchange bead; and treating the lithiated porous ion exchange bead with an acid solution to produce a salt solution comprising lithium ions.

In some embodiments, the liquid resource is a natural brine, a dissolved salt flat, seawater, concentrated seawater, a desalination effluent, a concentrated brine, a processed brine, waste brine from a bromine-extraction process, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

In some embodiments, the acid solution comprises hydrochloric acid, sulfuric acid, phosphoric acid, hydrobromic acid, chloric acid, perchloric acid, nitric acid, formic acid, acetic acid, or combinations thereof. In some embodiments, the method is conducted in a column, a vessel, or a stirred tank reactor.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Lithium is an essential element for batteries and other technologies. Lithium is found in a variety of liquid resources, including natural and synthetic brines and leachate solutions from minerals, clays, and recycled products. Lithium can be extracted from such liquid resources using an ion exchange process based on inorganic ion exchange materials. These inorganic ion exchange materials absorb lithium from a liquid resource while releasing hydrogen, and then elute lithium in acid while absorbing hydrogen. This ion exchange process can be repeated to extract lithium from a liquid resource and yield a concentrated lithium solution. The concentrated lithium solution can be further processed into chemicals for the battery industry or other industries.

Ion exchange materials can be formed into small particles, which together constitute a fine powder. Small particle size is required to minimize the diffusion distance that lithium must travel into the core of the ion exchange particles. In some cases, these particles may be coated with protective surface coatings to minimize dissolution of the ion exchange materials while allowing efficient transfer of lithium and hydrogen to and from the particles, as disclosed in U.S. provisional application 62/421,934, filed on Nov. 14, 2016, entitled "Lithium Extraction with Coated Ion Exchange Particles," and incorporated in its entirety by reference.

One major challenge for lithium extraction using inorganic ion exchange particles is the loading of the particles into an ion exchange vessel in such a way that brine and acid can be pumped efficiently through the column with minimal clogging and minimal loss of particles from the vessel. The materials can be formed into beads, and the beads can be loaded into the vessel. This bead loading creates void spaces between the particles, and these void spaces facilitate movement of brine throughout the particles. The beads hold the ion exchange particles in place and prevent loss of particles the particles from the vessel. When the materials are formed into beads, the penetration of brine and acid solutions into the beads may become slow and challenging. A slow rate of convection and diffusion of the acid and brine solutions into the bead slows the kinetics of lithium absorption and release. Such slow kinetics can create problems for operation of an ion exchange system. Slow kinetics can require slow pumping rates through the vessel. Slow kinetics can also lead to low lithium recovery from the brine and inefficient use of acid to elute the lithium.

Figure 1:
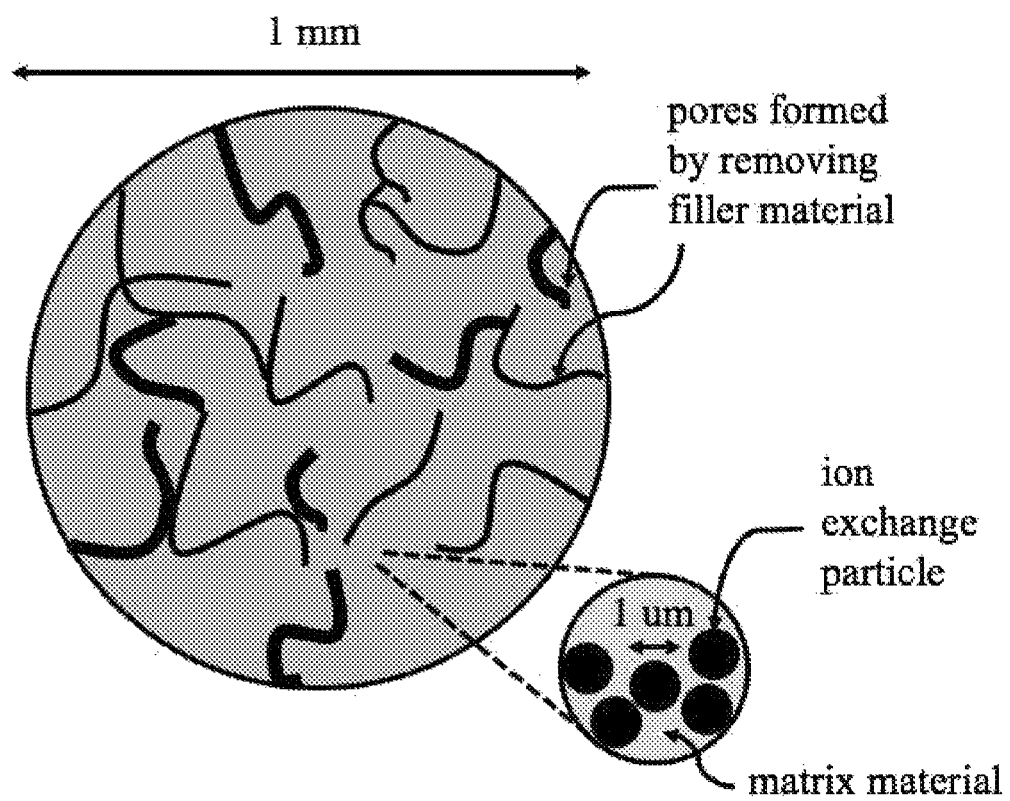
FIG. 1 depicts a porous bead containing ion exchange particles, matrix material, and pores formed by removing filler material.

The present invention includes a method for creating porous ion exchange beads with networks of pores that facilitate the transport into the beads of solutions that are pumped into an ion exchange vessel. Pore networks can be strategically controlled to provide fast and distributed access for the brine and acid solutions to penetrate into the bead and deliver lithium and hydrogen to the ion exchange particles. One example of a porous ion exchange bead is shown in FIG. 1.

The present method for creating ion exchange beads involves mixing of ion exchange particles, a matrix material, and a filler material. These components are mixed and formed into a bead. Then, the filler material is removed from the bead to leave behind pores. The filler material is dispersed in the bead in such a way to leave behind a pore structure that enables transport of lithium and hydrogen with fast kinetics. This method may involve multiple ion exchange materials, multiple polymer materials, and multiple filler materials.

Figure 2:
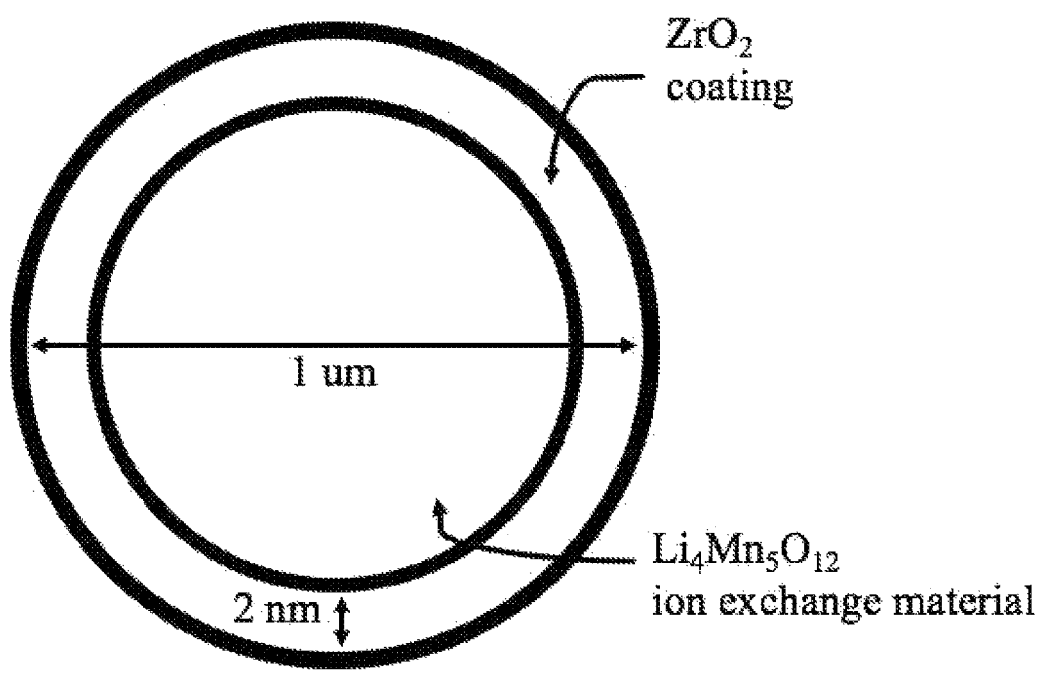
FIG. 2 depicts a coated ion exchange particle with a $Li_4Mn_5O_{12}$ ion exchange material and a $ZrO_2$ coating protecting the particle surface.

Another major challenge for lithium extraction using inorganic ion exchange materials is dissolution and degradation of the materials, especially during lithium elution in acid but also during lithium uptake in liquid resources. To yield a concentrated lithium solution from the ion exchange process, it is desirable to use a concentrated acid solution to elute the lithium. However, concentrated acid solutions dissolve and degrade inorganic ion exchange materials, which decreases the performance and lifespan of the materials. Therefore, the porous ion exchange beads may contain coated ion exchange particle for lithium extraction that are comprised of an ion exchange material and a coating material protecting the particle surface. The coating protects the ion exchange material from dissolution and degradation during lithium elution in acid, during lithium uptake from a liquid resource, and during other aspects of an ion exchange process. This coated particle enables the use of concentrated acids in the ion exchange process to yield concentrated lithium solutions. One example of a coated ion exchange particle is shown in FIG. 2.

In this invention, the ion exchange material is selected for high lithium absorption capacity, high selectivity for lithium in a liquid resource relative to other ions such as sodium and magnesium, strong lithium uptake in liquid resources including those with low concentrations of lithium, facile elution of lithium with a small excess of acid, and fast ionic diffusion. A coating material may be selected to protect the particle from dissolution and chemical degradation during lithium recovery in acid and also during lithium uptake in various liquid resources. A coating material may also be selected to facilitate diffusion of lithium and hydrogen between the particles and the liquid resources, to enable adherence of the particles to a structural support, and to suppress structural and mechanical degradation of the particles.

Figure 3:
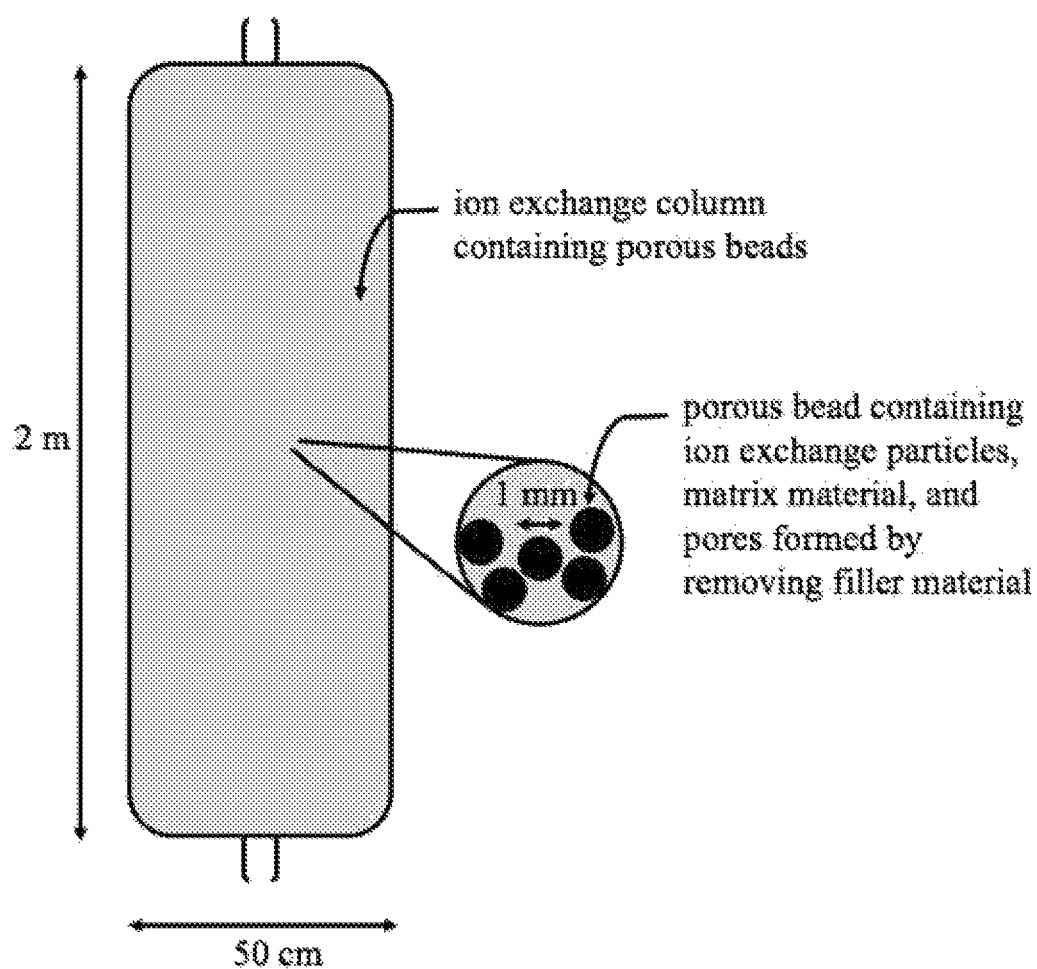
FIG. 3 depicts an ion exchange column loaded with porous polymer beads containing ion exchange particles, a matrix material, and pores formed by removing filler material.

The porous ion exchange beads may be loaded into an ion exchange vessel with a fixed, moving, or fluidized bed. One example of an ion exchange column is shown in FIG. 3. The ion exchange vessel directs liquids to percolate around and through the ion exchange beads, thereby facilitating ion exchange between the particles and the liquid resource. In some embodiments, the porous ion exchange beads may be mixed with a liquid resource to absorb lithium and then recovered through filtration, gravimetric separation, or other means.

When the porous ion exchange beads are used in an ion exchange vessel, the liquid resource containing lithium is pumped into the ion exchange vessel so that the ion exchange particles absorb lithium from the liquid resource while releasing hydrogen. After the beads have absorbed lithium and the liquid resource has been removed from the vessel, an acid solution is pumped into the vessel so that the particles release lithium into the acid solution while absorbing hydrogen. The vessel may be operated in co-flow mode with the liquid resource and acid solution alternately flowing through the vessel in the same direction, or the vessel may be operated in counter-flow mode with a liquid resource and acid solution alternately flowing through the vessel in opposite directions. The vessel may be operated in a mode that is batch, semi-continuous, or continuous. Between flows of the liquid resource and the acid solution, the column may be treated or washed with water or other solutions for purposes such as adjusting pH in the column or removing potential contaminants. The beads may form a fixed or moving bed, and the moving bed may move in counter-current to the brine and acid flows. The beads may be moved between multiple vessels with moving beds where different vessels are used for brine, acid, water, or other flows. Before or after the liquid resource flows into the vessel, the pH of the liquid may be adjusted with NaOH or other chemicals to facilitate the ion exchange reaction as well as handling or disposal of the spent liquid resource. Before or after the liquid resource flows into the vessel, the liquid resource may be subjected to other processes including other ion exchange processes, solvent extraction, evaporation, chemical treatment, or precipitation to remove lithium, to remove other chemical species, or to otherwise treat the brine.

When the ion exchange particles are treated with acid, a lithium solution is produced. This lithium solution may be further processed to produce lithium chemicals. These lithium chemicals may be supplied for an industrial application.

In some embodiments, an ion exchange material is selected from the following list: an oxide, a phosphate, an oxyfluoride, a fluorophosphate, or combinations thereof. In some embodiments, an ion exchange material is selected from the following list: $Li_4Mn_5O_{12}$, $Li_4Ti_5O_{12}$, $Li_2MO_3$ (M=Ti, Mn, Sn), $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl \cdot xAl(OH)_3 \cdot yH_2O$, $SnO_2 \cdot xSb_2O_5 \cdot yH_2O$, $TiO_2 \cdot xSb_2O_5 \cdot yH_2O$, solid solutions thereof, or combinations thereof. In some embodiments, an ion exchange material is selected from the following list: $Li_4Mn_5O_{12}$, $Li_4Ti_5O_{12}$, $Li_{1.6}Mn_{1.6}O_4$, $Li_2MO_3$ (M=Ti, Mn, Sn), $LiFePO_4$, solid solutions thereof, or combinations thereof. In some embodiments, the ion exchange material comprises $Li_4Mn_5O_{12}$. In some embodiments, the ion exchange material is $Li_4Mn_5O_{12}$.

In some embodiments, a coating material for protecting the surface of the ion exchange material is selected from the following list: a carbide, a nitride, an oxide, a phosphate, a fluoride, a polymer, carbon, a carbonaceous material, or combinations thereof. In some embodiments, a coating material is selected from the following list: $TiO_2$, $ZrO_2$, $MoO_2$, $SnO_2$, $Nb_2O_5$, $Ta_2O_5$, $SiO_2$, $Li_2TiO_3$, $Li_2ZrO_3$, $Li_2SiO_3$, $Li_2MnO_3$, $Li_2MoO_3$, $LiNbO_3$, $LiTaO_3$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, or combinations thereof. In some embodiments, a coating material is selected from the following list: polyvinyl fluoride, polyvinylidene difluoride, polyvinyl chloride, polyvinylidene dichloride, polyethylene, polypropylene, polyphenylene sulfide, polytetrafluoroethylene, polytetrofluoroethylene, sulfonated polytetrofluoroethylene, polystyrene, polydivinylbenzene, polybutadiene, poly-ethylene-tetrafluoroethyelene, polyacrylonitrile, sulfonated polymer, carboxylated polymer, Nafion, copolymers thereof, and combinations thereof. In some embodiments, a coating material is selected from the following list: $TiO_2$, $ZrO_2$, $MoO_2$, $SiO_2$, $Li_2TiO_3$, $Li_2ZrO_3$, $Li_2SiO_3$, $Li_2MnO_3$, $LiNbO_3$, $AlF_3$, SiC, $Si_3N_4$, graphitic carbon, amorphous carbon, diamond-like carbon, or combinations thereof. In some embodiments, the coating material is $TiO_2$, $SiO_2$ or $ZrO_2$. In a further aspect, a coating material comprises a chloro-polymer, a fluoro-polymer, a chloro-fluoro-polymer, a hydrophilic polymer, a hydrophobic polymer, co-polymers thereof, mixtures thereof, or combinations thereof. In a further aspect, a coating material comprises a co-polymer, a block co-polymer, a linear polymer, a branched polymer, a cross-linked polymer, a heat-treated polymer, a solution processed polymer, co-polymers thereof, mixtures thereof, or combinations thereof. In a further aspect, a coating material comprises polyethylene, low density polyethylene, high density polyethylene, polypropylene, polyphenylene sulfide, polyester, polytetrafluoroethylene (PTFE), types of polyamide, polyether ether ketone (PEEK), polysulfone, polyvinylidene difluoride (PVDF), poly (4-vinyl pyridine-co-styrene) (PVPCS), polystyrene (PS), polybutadiene, acrylonitrile butadiene styrene (ABS), polyvinyl chloride (PVC), polyvinylidene dichloride, ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluorosulfonic acid (Nafion®), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene difluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof. In a further aspect, a coating is deposited onto an ion exchange particle by dry mixing, mixing in solvent, emulsion, extrusion, bubbling one solvent into another, casting, heating, evaporating, vacuum evaporation, spray drying, vapor deposition, chemical vapor deposition, microwaving, hydrothermal synthesis, polymerization, co-polymerization, cross-linking, irradiation, catalysis, foaming, other deposition methods, or combinations thereof. In a further aspect, a coating is deposited using a solvent comprising n-methyl-2-pyrrolidone, dimethyl sulfoxide, tetrahydrofuran, dimethylformamide, dimethylacetamide, methyl ethyl ketone, ethanol, acetone, other solvents, or combinations thereof.

In some embodiments, the ion exchange particles may have an average diameter that is selected from the following list: less than 10 nm, less than 100 nm, less than 1,000 nm, less than 10,000 nm, less than 100,000 nm, or less than 500,000 nm. In some embodiments, the ion exchange particles may have an average diameter that is selected from the following list: greater than 10,000 nm, greater than 100,000 nm, or greater than 1,000,000 nm. In some embodiments, the ion exchange particles may have an average size that is selected from the following list: less than 200 nm, less than 2,000 nm, or less than 20,000 nm.

In some embodiments, the ion exchange particles may be secondary particles comprised of smaller primary particles that may have an average diameter selected from the following list: less than 10 nm, less than 100 nm, less than 1,000 nm, or less than 10,000 nm. In some embodiments, the ion exchange particles may be secondary particles comprised of smaller primary particles that may have an average diameter greater than 10,000 nm or greater than 100,000 nm.

In some embodiments, the ion exchange particles have a coating material with a thickness selected from the following list: less than 1 nm, less than 10 nm, less than 100 nm, less than 1,000 nm, or less than 20,000 nm. In some embodiments, the ion exchange particles have a coating material with a thickness selected from the following list: greater than 1,000 nm, greater than 10,000 nm, or greater than 100,000 nm. In some embodiments, the coating material has a thickness selected from the following list: less than 1 nm, less than 10 nm, or less than 100 nm.

In some embodiments, the ion exchange material and a coating material may form one or more concentration gradients where the chemical composition of the particle ranges between two or more compositions. In some embodiments, the ion exchange materials and the coating materials may form a concentration gradient that extends over a thickness selected from the following list: less than 1 nm, less than 10 nm, less than 100 nm, less than 1,000 nm, less than 10,000 nm, or less than 100,000 nm. In some embodiments, the coating material may be similar in composition to the ion exchange material. In some embodiments, the coating material may be identical in composition to the ion exchange material but with one or more elements doped into the coating material. In some embodiments, the coating material may comprise a modified version of the ion exchange material. In some embodiments, the coating material may comprise $Li_4Mn_5O_{12}$, $Li_4Ti_5O_{12}$, $Li_2MO_3$ (M=Ti, Mn, Sn), $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, or combinations thereof. In some embodiments, the coating material may be doped with elements from the following list: Ti, Zr, Si, V, B, Al, or Mg. In some embodiments the doping may extend over a thickness selected from the following list: greater than 1 nm, greater than 10 nm, greater than 100 nm, greater than 1 micron, greater than 10 microns, or greater than 100 microns.

In some embodiments, the ion exchange material is synthesized by a method selected from the following list: hydrothermal, solvothermal, sol-gel, solid state, molten salt flux, ion exchange, microwave, ball milling, precipitation, or vapor deposition. In some embodiments, the ion exchange material is synthesized by a method selected from the following list: hydrothermal, solid state, or microwave.

In some embodiments, a coating material is deposited by a method selected from the following list: chemical vapor deposition, atomic layer deposition, physical vapor deposition, hydrothermal, solvothermal, sol-gel, solid state, molten salt flux, ion exchange, microwave, wet impregnation, precipitation, titration, aging, ball milling, or combinations thereof. In some embodiments, the coating material is deposited by a method selected from the following list: chemical vapor deposition, hydrothermal, titration, solvothermal, wet impregnation, sol-gel, precipitation, microwave, or combinations thereof.

In some embodiments, a coating material is deposited with physical characteristics selected from the following list: crystalline, amorphous, full coverage, partial coverage, uniform, non-uniform, or combinations thereof.

In some embodiments, multiple coatings may be deposited on the ion exchange material in an arrangement selected from the following list: concentric, patchwork, or combinations thereof.

In some embodiments, the matrix is selected from the following list: a polymer, an oxide, a phosphate, or combinations thereof. In some embodiments, a structural support is selected from the following list: polyvinyl fluoride, polyvinylidene difluoride, polyvinyl chloride, polyvinylidene dichloride, polyethylene, polypropylene, polyphenylene sulfide, polytetrafluoroethylene, polytetrofluoroethylene, sulfonated polytetrofluoroethylene, polystyrene, polydivinylbenzene, polybutadiene, poly-ethylene-tetrafluoroethylene, polyacrylonitrile, sulfonated polymer, carboxylated polymer, Nafion, copolymers thereof, and combinations thereof. In some embodiments, a structural support is selected from the following list: polyvinylidene difluoride, polyvinyl chloride, sulfonated polytetrofluoroethylene, polystyrene, polydivinylbenzene, copolymers thereof, or combinations thereof. In some embodiments, a structural support is selected from the following list: titanium dioxide, zirconium dioxide, silicon dioxide, solid solutions thereof, or combinations thereof. In some embodiments, the matrix material is selected for thermal resistance, acid resistance, and/or other chemical resistance. In a further aspect, a structural support comprises a chloro-polymer, a fluoro-polymer, a chloro-fluoro-polymer, a hydrophilic polymer, a hydrophobic polymer, co-polymers thereof, mixtures thereof, or combinations thereof. In a further aspect, a structural support comprises a co-polymer, a block co-polymer, a linear polymer, a branched polymer, a cross-linked polymer, a heat-treated polymer, a solution processed polymer, co-polymers thereof, mixtures thereof, or combinations thereof. In a further aspect, a structural support comprises polyethylene, low density polyethylene, high density polyethylene, polypropylene, polyphenylene sulfide, polyester, polytetrafluoroethylene (PTFE), types of polyamide, polyether ether ketone (PEEK), polysulfone, polyvinylidene difluoride (PVDF), poly (4-vinyl pyridine-co-styrene) (PVPCS), polystyrene (PS), polybutadiene, acrylonitrile butadiene styrene (ABS), polyvinyl chloride (PVC), polyvinylidene dichloride, ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluorosulfonic acid (Nafion), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a structural support comprises polyvinylidene difluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof. In a further aspect, a structural support is processed by dry mixing, mixing in solvent, emulsion, extrusion, bubbling one solvent into another, casting, heating, evaporating, vacuum evaporation, spray drying, vapor deposition, chemical vapor deposition, microwaving, hydrothermal synthesis, polymerization, co-polymerization, cross-linking, irradiation, catalysis, foaming, other deposition methods, or combinations thereof. In a further aspect, a structural support is deposited using a solvent comprising n-methyl-2-pyrrolidone, dimethyl sulfoxide, tetrahydrofuran, dimethylformamide, dimethylacetamide, methyl ethyl ketone, ethanol, acetone, other solvents, or combinations thereof.

In some embodiments, the porous bead is formed by mixing the ion exchange particles, the matrix material, and the filler material together at once. In one embodiment, the porous bead is formed by first mixing the ion exchange particles and the matrix material, and then mixing with the filler material. In some embodiments, the porous bead is formed by first mixing the ion exchange particles and the filler material, and then mixing with the matrix material. In some embodiments, the porous bead is formed by first mixing the matrix material and the filler material, and then mixing with the ion exchange particles.

In some embodiments, the porous bead is formed by mixing the ion exchange particles, the matrix material, and/or the filler material with a solvent that dissolves once or more of the components. In some embodiments, the filler is a solvent or solution that suspends or dissolves the ion exchange material or matrix material. In some embodiments, the porous bead is formed by mixing the ion exchange particles, the matrix material, and/or the filler material as dry powders in a mixer or ball mill. In some embodiments, the porous bead is formed by mixing the ion exchange particles, the matrix material, and/or the filler material in a spray drier.

In some embodiments, the matrix material is a polymer that is dissolved and mixed with the ion exchange particles and/or filler material. In some embodiments, the matrix material is a polymer that is dissolved and mixed with the ion exchange particles and/or filler material using a solvent from the following list: n-methyl-2-pyrrolidone, dimethyl sulfoxide, tetrahydrofuran, dimethylformamide, dimethylacetamide, methyl ethyl ketone, ethanol, acetone, other solvents or combinations thereof. In some embodiments, the filler material is a salt that is dissolved and mixed with the ion exchange particles and/or matrix material using a solvent from the following list: water, ethanol, iso-propyl alcohol, acetone, or combinations thereof.

In some embodiments, the filler material is a salt that is dissolved out of the bead to form pores using a solution. In some embodiments, the filler material is a salt that is dissolved out of the bead to form pores using a solution selected from the following list: water, ethanol, iso-propyl alcohol, a surfactant mixture, an acid, a base, or combinations thereof. In some embodiments, the filler material is a material that thermally decomposes to form a gas at high temperature so that the gas can leave the bead to form pores. In some embodiments, the filler material is a material that thermally decomposes to form a gas at high temperature so that the gas can leave the bead to form pores, where the gas is selected from the following list: water vapor, oxygen, nitrogen, chlorine, carbon dioxide, nitrogen oxides, organic vapors, or combinations thereof.

In some embodiments, the porous ion exchange bead is formed from dry powder. In some embodiments, the porous ion exchange bead is formed from dry powder using a mechanical press, a pellet press, a tablet press, a pill press, a rotary press, dry powder mixing, or combinations thereof. In some embodiments, the porous ion exchange bead is formed from a solvent slurry by dripping, bubbling, or extruding the slurry into a different liquid solution. The solvent slurry may be formed using a solvent of n-methyl-2-pyrrolidone, dimethyl sulfoxide, tetrahydrofuran, dimethylformamide, dimethylacetamide, methyl ethyl ketone, or combinations thereof. The different liquid solution may be formed using water, ethanol, iso-propyl alcohol, acetone, or combinations thereof.

In some embodiments, the porous bead is formed by first forming a bulk composite and then dividing the bulk composite into smaller beads. In some embodiments, the beads may be granules. In some embodiments, the beads may be formed from a bulk composite by slicing, crushing, or grinding a bulk composite.

An aspect described herein is a porous ion exchange bead comprising ion exchange material and a matrix material, wherein the porous ion exchange bead is prepared by a process comprising the steps of: combining the ion exchange material and the matrix material with a filler material to produce a precursor bead; and removing the filler material.

In some embodiments, the ion exchange material is selected from coated ion exchange particles, uncoated ion exchange particles, and combinations thereof.

In some embodiments, the coated ion exchange particles comprise an ion exchange material and a coating material. In some embodiments, the coating material of the coated ion exchange particles comprises a carbide, a nitride, an oxide, a phosphate, a fluoride, a polymer, carbon, a carbonaceous material, or combinations thereof. In some embodiments, the coating material of the coated ion exchange particles is selected from the group consisting of $TiO_2$, $ZrO_2$, $MoO_2$, $SnO_2$, $Nb_2O_5$, $Ta_2O_5$, $SiO_2$, $Li_2TiO_3$, $Li_2ZrO_3$, $Li_2SiO_3$, $Li_2MnO_3$, $Li_2MoO_3$, $LiNbO_3$, $LiTaO_3$, $AlPO_4$, $LaPO_4$, $ZrP_2O_7$, $MoP_2O_7$, $Mo_2P_3O_{12}$, $BaSO_4$, $AlF_3$, SiC, TiC, ZrC, ZrN, BN, carbon, graphitic carbon, amorphous carbon, hard carbon, diamond-like carbon, solid solutions thereof, and combinations thereof. In some embodiments, the coating material of the coated ion exchange particles is selected from the group consisting of $TiO_2$, $ZrO_2$, $MoO_2$, $SnO_2$, $Nb_2O_5$, $Ta_2O_5$, $SiO_2$, $Li_2TiO_3$, $Li_2ZrO_3$, $Li_2SiO_3$, $Li_2MnO_3$, $Li_2MoO_3$, $LiNbO_3$, $LiTaO_3$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, solid solutions thereof, and combinations thereof. In some embodiments, the coating material is $SiO_2$ or $ZrO_2$. In some embodiments, the coating material of the coated ion exchange particles is selected from the group consisting of carbon, graphitic carbon, amorphous carbon, hard carbon, diamond-like carbon, solid solutions thereof, and combinations thereof. In some embodiments, the coating material of the coated ion exchange particles is selected from the group consisting of polyvinyl fluoride, polyvinylidene difluoride, polyvinyl chloride, polyvinylidene dichloride, polyethylene, polypropylene, polyphenylene sulfide, polytetrafluoroethylene, polytetrofluoroethylene, sulfonated polytetrofluoroethylene, polystyrene, polydivinylbenzene, polybutadiene, poly-ethylene-tetrafluoroethyelene, polyacrylonitrile, sulfonated polymer, carboxylated polymer, tetrafluoroethylene-perfluoro-3,6-dioxa-4-methyl-7-octenesulfonic acid copolymer, copolymers thereof, and combinations thereof.

In some of embodiments, the ion exchange material of the coated ion exchange particles comprises an oxide, a phosphate, an oxyfluoride, a fluorophosphate, or combinations thereof. In some embodiments, the ion exchange material of the coated ion exchange particles is selected from the group consisting of $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, and combinations thereof; wherein x is from 0.1-10; and y is from 0.1-10. In some embodiments, x is selected from 0.1, 0.2, 0.3, 0.4, 0.5, 0.6, 0.7, 0.8, 0.9, 1, 2, 3, 4, 5, 6, 7, 8, 9, and 10. In some embodiments, y is selected from 0.1, 0.2, 0.3, 0.4, 0.5, 0.6, 0.7, 0.8, 0.9, 1, 2, 3, 4, 5, 6, 7, 8, 9, and 10. In some embodiments, x and y are independently selected from 0.1, 0.2, 0.3, 0.4, 0.5, 0.6, 0.7, 0.8, 0.9, 1, 2, 3, 4, 5, 6, 7, 8, 9, and 10. In some embodiments, the ion exchange material of the coated ion exchange particles is selected from $Li_2SnO_3$, $Li_2MnO_3$, $Li_2TiO_3$, $Li_4Ti_5O_{12}$, $Li_4Mn_5O_{12}$, $Li_{1.6}Mn_{1.6}O_4$, and combinations thereof. In some embodiments, the ion exchange material of the coated ion exchange particles is $Li_4Mn_5O_{12}$.

In some embodiments, the uncoated ion exchange particles comprise an ion exchange material. In some embodiments, the ion exchange material of the uncoated ion exchange particles comprises an oxide, a phosphate, an oxyfluoride, a fluorophosphate, or combinations thereof. In some embodiments, the ion exchange material of the uncoated ion exchange particles is selected from the group consisting of $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, and combinations thereof; wherein x is from 0.1-10; and y is from 0.1-10. In some embodiments, x is selected from 0.1, 0.2, 0.3, 0.4, 0.5, 0.6, 0.7, 0.8, 0.9, 1, 2, 3, 4, 5, 6, 7, 8, 9, and 10. In some embodiments, y is selected from 0.1, 0.2, 0.3, 0.4, 0.5, 0.6, 0.7, 0.8, 0.9, 1, 2, 3, 4, 5, 6, 7, 8, 9, and 10. In some embodiments, x and y are independently selected from 0.1, 0.2, 0.3, 0.4, 0.5, 0.6, 0.7, 0.8, 0.9, 1, 2, 3, 4, 5, 6, 7, 8, 9, and 10. In some embodiments, the ion exchange material of the uncoated ion exchange particles is selected from $Li_2SnO_3$, $Li_2MnO_3$, $Li_2TiO_3$, $Li_4Ti_5O_{12}$, $Li_4Mn_5O_{12}$, $Li_{1.6}Mn_{1.6}O_4$, and combinations thereof. In some embodiments, the ion exchange material of the uncoated ion exchange particles is $Li_4Mn_5O_{12}$.

In some embodiments, the matrix material comprises a polymer, an oxide, a phosphate, or combinations thereof. In some embodiments, the matrix material is selected from the group consisting of polyvinyl fluoride, polyvinylidene difluoride, polyvinyl chloride, polyvinylidene dichloride, polyethylene, polypropylene, polyphenylene sulfide, polytetrafluoroethylene, polytetrofluoroethylene, sulfonated polytetrofluoroethylene, polystyrene, polydivinylbenzene, polybutadiene, poly-ethylene-tetrafluoroethyelene, polyacrylonitrile, sulfonated polymer, carboxylated polymer, tetrafluoroethylene-perfluoro-3,6-dioxa-4-methyl-7-octenesulfonic acid copolymer, copolymers thereof, and combinations thereof.

In some embodiments, the filler material is removed by treating the precursor bead with a solvent. In some embodiments, the solvent dissolves the filler material in the precursor bead. In some embodiments, the solvent is selected from the group consisting of water, ethanol, iso-propyl alcohol, acetone, and combinations thereof.

In some embodiments, the filler material comprises a salt, a liquid, an organic material, or a combination of one or more thereof. In some embodiments, the filler material is a salt. In some embodiments, the filler material is a halide salt, a sulfate salt, a bisulfate salt, a carbonate salt, a bicarbonate salt, a nitrate salt, an alkali metal salt, an alkali earth metal salt, or combinations of one or more thereof. In some embodiments the halide salt is a chloride salt, a bromide salt, a fluoride salt, an iodide salt, or combinations thereof. In some embodiments, the filler material is an organic material. In some embodiments, the filler material is an organic material, wherein the organic material is a polymer or an organic liquid. In some embodiments, the filler material is a liquid. In some embodiments, the filler material is a liquid, wherein the liquid is an organic liquid, an aqueous liquid, or combinations thereof. In some embodiments, the filler material is a chloride salt, sodium chloride, a sulfate salt, a carbonate salt, a nitrate salt, an alkali metal salt, an alkali earth metal salt, an organic material, a polymer, an aqueous liquid, an organic liquid, a liquid mixture, or combinations thereof. In some embodiments, the filler material is sodium chloride.

In some embodiments, the filler material is removed by sublimation or evaporation, optionally subjecting the precursor bead to heat, vacuum, air, or combinations thereof. In some embodiments, the filler material is removed by sublimation or evaporation, optionally subjecting the precursor bead to heat, sub-atmospheric pressure, ambient air, or combinations thereof. In some embodiments, the filler material is removed by subjecting the precursor bead to heat. In some embodiments, the heat decomposes the filler material. In some embodiments, the heat decomposes a portion or essentially all of the filler material. In some embodiments, the heat decomposes a portion of the filler material. In some embodiments, the heat decomposes essentially all of the filler material. In some embodiments, the filler comprises a solvent that may dissolve or suspend the ion exchange material or the matrix material. In some embodiments, the filler comprises a surfactant that may dissolve or suspend the ion exchange material or the matrix material.

In some embodiments, the porous ion exchange bead is approximately spherical with an average diameter selected from the following list: less than 10 um, less than 100 um, less than 1 mm, less than 1 cm, or less than 10 cm. In some embodiments, the porous ion exchange bead is approximately spherical with an average diameter selected from the following list: less than 200 um, less than 2 mm, or less than 20 mm. In some embodiments, the porous ion exchange bead is non-spherical, irregularly shaped, or granular.

In some embodiments, the porous ion exchange beads have a number average diameter less than about 10 µm. In some embodiments, the porous ion exchange beads have a number average diameter less than about 100 µm. In some embodiments, the porous ion exchange beads have a number average diameter less than about 1,000 µm. In some embodiments, the porous ion exchange beads have a number average diameter greater than about 1,000 µm. In some embodiments, the porous ion exchange beads have a weight average diameter less than about 10 µm. In some embodiments, the porous ion exchange beads have a weight average diameter less than about 100 µm. In some embodiments, the porous ion exchange beads have a weight average diameter less than about 1,000 µm. In some embodiments, the porous ion exchange beads have a weight average diameter greater than about 1,000 µm.

In some embodiments, the porous ion exchange bead has an average diameter of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 1,000 µm, less than about 10,000 µm, less than about 100,000 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 1,000 µm, more than about 10,000 µm, from about 1 µm to about 10,000 µm, from about 1 µm to about 1,000 µm, from about 1 µm to about 100 µm, from about 1 µm to about 80 µm, from about 1 µm to about 60 µm, from about 1 µm to about 40 µm, or from about 1 µm to about 20 µm. In some embodiments, the porous ion exchange bead has an average size of less than about 100 µm, less than about 1,000 µm, or less than about 10,000 µm. In some embodiments, the porous ion exchange bead has an average diameter from about 1 µm to about 300 µm, from about 1 µm to about 200 µm, from about 1 µm to about 100 µm, from about 1 µm to about 80 µm, from about 1 µm to about 60 µm, from about 1 µm to about 40 µm, or from about 1 µm to about 20 µm. In some embodiments, the porous ion exchange bead is tablet-shaped with a diameter of less than 1 mm, less than 2 mm, less than 4 mm, less than 8 mm, or less than 20 mm and with a height of less than 1 mm, less than 2 mm, less than 4 mm, less than 8 mm, or less than 20 mm. In some embodiments, the porous ion exchange bead has an irregular shape or granule shape. In some embodiments, the porous ion exchange bead is processed with crushing, slicing, grinding, or combinations thereof.

In some embodiments, the porous ion exchange bead is embedded in a support structure, which may be a membrane, a spiral-wound membrane, a hollow fiber membrane, or a mesh. In some embodiments, the porous ion exchange bead is embedded on a support structure comprised of a polymer, a ceramic, or combinations thereof. In some embodiments, the porous ion exchange bead is loaded directly into an ion exchange vessel with no additional support structure. In some embodiments, the porous ion exchange bead is loaded into a compartment, a stirred tank reactor, or a compartment in a stirred tank reactor.

An aspect described herein is a method of making porous ion exchange beads, comprising: (a) combining and mixing ion exchange particles that reversibly exchange lithium and hydrogen, a matrix material, and a filler material to make a mixture; (b) forming the mixture into beads; (c) optionally heating the beads; and (d) removing a portion or essentially all of the filler material to make porous ion exchange beads.

In some embodiments, the combining and mixing are done using dry powders. In some embodiments, the combining and mixing are done using one or more solvents and the mixture is a slurry. In some embodiments, the forming is done using a mechanical press. In some embodiments, the forming is done by injecting the slurry into a liquid. In some embodiments, the heating is sufficient to melt or sinter the matrix material.

In some embodiments, the removing is done by dissolving the filler material using a solvent. In some embodiments, the removing is done by dissolving the filler material using a solvent wherein the solvent is an aqueous solvent, an organic solvent, or a mixture of one or more aqueous solvents and one or more organic solvents. In some embodiments, the removing is done by dissolving the filler material using an aqueous solvent comprising an acid, a base, a brine, or a combination thereof. In some embodiments, the removing is done by dissolving the filler material using water. In some embodiments, the removing is done by dissolving the filler material using a brine. In some embodiments, the removing is done by dissolving the filler material using an organic solvent. In some embodiments, the removing is done by dissolving the filler material using an organic solvent, wherein the organic solvent is an alcohol, a ketone, an aldehyde, an amine, a carboxylic acid, or a combination thereof. In some embodiments, the removing is done by dissolving the filler material using an alcohol. In some embodiments, the removing is done by dissolving the filler material using an alcohol, wherein the alcohol is methanol, ethanol, normal-propanol, isopropanol, normal-butanol, isobutanol, tertiary-butanol, or combinations thereof. In some embodiments, the removing is done by dissolving the filler material using a ketone, wherein the ketone is acetone, methylethylketone, or combinations thereof. In some embodiments, the removing is done by dissolving the filler material using acetone. In some embodiments, the removing is done by dissolving the filler material using a mixture of water and acetone. In some embodiments, the removing is done by dissolving the filler material using water, an aqueous solution, an acid, a brine, an alcohol, or combinations thereof. In some embodiments, the removing is done by dissolving the filler material using an aqueous solution, an alcohol, or combinations thereof.

In some embodiments, the removing is done by heating the beads. In some embodiments, the removing is done by heating the beads to decompose the filler material. In some embodiments, the removing is done by heating the beads sufficient to decompose the filler material to gaseous particles or decomposition products. In some embodiments, the removing is done by heating the beads to decompose the filler material to volatile decomposition products. In some embodiments, the removing is done by heating the beads to evaporate the filler material. In some embodiments, the removing is done by heating the beads to evaporate the filler material and then the filler material is captured and reused.

An aspect described herein is a method of making a porous ion exchange bead for extraction of lithium from a liquid resource comprising: forming a precursor bead wherein the precursor bead comprises an ion exchange material, a matrix material and a filler material; and removing at least a portion of the filler material to produce the porous ion exchange bead.

In some embodiments, the removing is done by putting the precursor bead into service intended for the porous ion exchange bead and by dissolving the filler material using the service medium as a solvent.

In some embodiments, essentially all of the filler material is removed. In some embodiments, a portion of the filler material is removed.

In some embodiments, the ion exchange material is selected from coated ion exchange particles, uncoated ion exchange particles, and combinations thereof.

In some embodiments, the coated ion exchange particles comprise an ion exchange material and a coating material. In some embodiments, the coating material of the coated ion exchange particles comprises a carbide, a nitride, an oxide, a phosphate, a fluoride, a polymer, carbon, a carbonaceous material, or combinations thereof. In some embodiments, the coating material of the coated ion exchange particles is selected from the group consisting of $TiO_2$, $ZrO_2$, $MoO_2$, $SnO_2$, $Nb_2O_5$, $Ta_2O_5$, $SiO_2$, $Li_2TiO_3$, $Li_2ZrO_3$, $Li_2SiO_3$, $Li_2MnO_3$, $Li_2MoO_3$, $LiNbO_3$, $LiTaO_3$, $AlPO_4$, $LaPO_4$, $ZrP_2O_7$, $MoP_2O_7$, $Mo_2P_3O_{12}$, $BaSO_4$, $AlF_3$, SiC, TiC, ZrC, ZrN, BN, carbon, graphitic carbon, amorphous carbon, hard carbon, diamond-like carbon, solid solutions thereof, and combinations thereof. In some embodiments, the coating material of the coated ion exchange particles is selected from the group consisting of $TiO_2$, $ZrO_2$, $MoO_2$, $SnO_2$, $Nb_2O_5$, $Ta_2O_5$, $SiO_2$, $Li_2TiO_3$, $Li_2ZrO_3$, $Li_2SiO_3$, $Li_2MnO_3$, $Li_2MoO_3$, $LiNbO_3$, $LiTaO_3$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, solid solutions thereof, and combinations thereof. In some embodiments, the coating material is $SiO_2$ or $ZrO_2$. In some embodiments, the coating material of the coated ion exchange particles is selected from the group consisting of carbon, graphitic carbon, amorphous carbon, hard carbon, diamond-like carbon, solid solutions thereof, and combinations thereof. In some embodiments, the coating material of the coated ion exchange particles is selected from the group consisting of polyvinyl fluoride, polyvinylidene difluoride, polyvinyl chloride, polyvinylidene dichloride, polyethylene, polypropylene, polyphenylene sulfide, polytetrafluoroethylene, polytetrofluoroethylene, sulfonated polytetrofluoroethylene, polystyrene, polydivinylbenzene, polybutadiene, poly-ethylene-tetrafluoroethyelene, polyacrylonitrile, sulfonated polymer, carboxylated polymer, tetrafluoroethylene-perfluoro-3,6-dioxa-4-methyl-7-octenesulfonic acid copolymer, copolymers thereof, and combinations thereof.

In some of embodiments, the ion exchange material of the coated ion exchange particles comprises an oxide, a phosphate, an oxyfluoride, a fluorophosphate, or combinations thereof. In some embodiments, the ion exchange material of the coated ion exchange particles is selected from the group consisting of $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, and combinations thereof; wherein x is from 0.1-10; and y is from 0.1-10. In some embodiments, x is selected from 0.1, 0.2, 0.3, 0.4, 0.5, 0.6, 0.7, 0.8, 0.9, 1, 2, 3, 4, 5, 6, 7, 8, 9, and 10. In some embodiments, y is selected from 0.1, 0.2, 0.3, 0.4, 0.5, 0.6, 0.7, 0.8, 0.9, 1, 2, 3, 4, 5, 6, 7, 8, 9, and 10. In some embodiments, x and y are independently selected from 0.1, 0.2, 0.3, 0.4, 0.5, 0.6, 0.7, 0.8, 0.9, 1, 2, 3, 4, 5, 6, 7, 8, 9, and 10. In some embodiments, the ion exchange material of the coated ion exchange particles is selected from $Li_2SnO_3$, $Li_2MnO_3$, $Li_2TiO_3$, $Li_4Ti_5O_{12}$, $Li_4Mn_5O_{12}$, $Li_{1.6}Mn_{1.6}O_4$, and combinations thereof. In some embodiments, the ion exchange material of the coated ion exchange particles is $Li_4Mn_5O_{12}$.

In some embodiments, the uncoated ion exchange particles comprise an ion exchange material. In some embodiments, the ion exchange material of the uncoated ion exchange particles comprises an oxide, a phosphate, an oxyfluoride, a fluorophosphate, or combinations thereof. In some embodiments, the ion exchange material of the uncoated ion exchange particles is selected from the group consisting of $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, and combinations thereof; wherein x is from 0.1-10; and y is from 0.1-10. In some embodiments, x is selected from 0.1, 0.2, 0.3, 0.4, 0.5, 0.6, 0.7, 0.8, 0.9, 1, 2, 3, 4, 5, 6, 7, 8, 9, and 10. In some embodiments, y is selected from 0.1, 0.2, 0.3, 0.4, 0.5, 0.6, 0.7, 0.8, 0.9, 1, 2, 3, 4, 5, 6, 7, 8, 9, and 10. In some embodiments, x and y are independently selected from 0.1, 0.2, 0.3, 0.4, 0.5, 0.6, 0.7, 0.8, 0.9, 1, 2, 3, 4, 5, 6, 7, 8, 9, and 10. In some embodiments, the ion exchange material of the uncoated ion exchange particles is selected from $Li_2SnO_3$, $Li_2MnO_3$, $Li_2TiO_3$, $Li_4Ti_5O_{12}$, $Li_4Mn_5O_{12}$, $Li_{1.6}Mn_{1.6}O_4$, and combinations thereof. In some embodiments, the ion exchange material of the uncoated ion exchange particle is $Li_4Mn_5O_{12}$.

In some embodiments, the matrix material comprises a polymer, an oxide, a phosphate, or combinations thereof. In some embodiments, the matrix material is selected from the group consisting of polyvinyl fluoride, polyvinylidene difluoride, polyvinyl chloride, polyvinylidene dichloride, polyethylene, polypropylene, polyphenylene sulfide, polytetrafluoroethylene, polytetrofluoroethylene, sulfonated polytetrofluoroethylene, polystyrene, polydivinylbenzene, polybutadiene, poly-ethylene-tetrafluoroethyelene, polyacrylonitrile, sulfonated polymer, carboxylated polymer, tetrafluoroethylene-perfluoro-3,6-dioxa-4-methyl-7-octenesulfonic acid copolymer, copolymers thereof, and combinations thereof.

In some embodiments, the filler material is removed by treating the precursor bead with a solvent. In some embodiments, the solvent dissolves the filler material in the precursor bead. In some embodiments, the solvent is selected from the group consisting of water, ethanol, iso-propyl alcohol, acetone, and combinations thereof.

In some embodiments, the filler material comprises a salt, a liquid, an organic material, or a combination of one or more thereof. In some embodiments, the filler material is a salt. In some embodiments, the filler material is a halide salt, a sulfate salt, a bisulfate salt, a carbonate salt, a bicarbonate salt, a nitrate salt, an alkali metal salt, an alkali earth metal salt, or combinations of one or more thereof. In some embodiments the halide salt is a chloride salt, a bromide salt, a fluoride salt, an iodide salt, or combinations thereof. In some embodiments, the filler material is an organic material. In some embodiments, the filler material is an organic material, wherein the organic material is a polymer or an organic liquid. In some embodiments, the filler material is a liquid. In some embodiments, the filler material is a liquid, wherein the liquid is an organic liquid, an aqueous liquid, or combinations thereof. In some embodiments, the filler material is a chloride salt, sodium chloride, a sulfate salt, a carbonate salt, a nitrate salt, an alkali metal salt, an alkali earth metal salt, an organic material, a polymer, an aqueous liquid, an organic liquid, a liquid mixture, or combinations thereof. In some embodiments, the filler material is sodium chloride.

In some embodiments, the filler material is removed by sublimation or evaporation, optionally subjecting the precursor bead to heat, vacuum, air, or combinations thereof. In some embodiments, the filler material is removed by sublimation or evaporation, optionally subjecting the precursor bead to heat, sub-atmospheric pressure, ambient air, or combinations thereof. In some embodiments, the filler material is removed by subjecting the precursor bead to heat. In some embodiments, the heat decomposes the filler material. In some embodiments, the heat decomposes a portion or essentially all of the filler material. In some embodiments, the heat decomposes a portion of the filler material. In some embodiments, the heat decomposes essentially all of the filler material.

An aspect described herein is a method of making porous ion exchange beads, comprising: (a) combining and mixing ion exchange particles that reversibly exchange lithium and hydrogen, a matrix material, and a filler material to make a mixture; (b) forming the mixture into beads; (c) optionally heating the beads; and (d) removing a portion or essentially all of the filler material to make porous ion exchange beads, wherein the ion exchange material is selected from coated ion exchange particles, uncoated ion exchange particles, and combinations thereof.

In some embodiments, the coated ion exchange particles comprise an ion exchange material and a coating material. In some embodiments, the coating material of the coated ion exchange particles comprises a carbide, a nitride, an oxide, a phosphate, a fluoride, a polymer, carbon, a carbonaceous material, or combinations thereof. In some embodiments, the coating material of the coated ion exchange particles is selected from the group consisting of $TiO_2$, $ZrO_2$, $MoO_2$, $SnO_2$, $Nb_2O_5$, $Ta_2O_5$, $SiO_2$, $Li_2TiO_3$, $Li_2ZrO_3$, $Li_2SiO_3$, $Li_2MnO_3$, $Li_2MoO_3$, $LiNbO_3$, $LiTaO_3$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, and combinations thereof. In some embodiments, the coating material of the coated ion exchange particles is selected from the group consisting of $TiO_2$, $ZrO_2$, $MoO_2$, $SnO_2$, $Nb_2O_5$, $Ta_2O_5$, $SiO_2$, $Li_2TiO_3$, $Li_2ZrO_3$, $Li_2SiO_3$, $Li_2MnO_3$, $Li_2MoO_3$, $LiNbO_3$, $LiTaO_3$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, solid solutions thereof, and combinations thereof. In some embodiments, the coating material is $SiO_2$ or $ZrO_2$. In some embodiments, the coating material of the coated ion exchange particles is selected from the group consisting of carbon, graphitic carbon, amorphous carbon, hard carbon, diamond-like carbon, solid solutions thereof, and combinations thereof. In some embodiments, the coating material of the coated ion exchange particles is selected from the group consisting of polyvinyl fluoride, polyvinylidene difluoride, polyvinyl chloride, polyvinylidene dichloride, polyethylene, polypropylene, polyphenylene sulfide, polytetrafluoroethylene, polytetrofluoroethylene, sulfonated polytetrofluoroethylene, polystyrene, polydivinylbenzene, polybutadiene, poly-ethylene-tetrafluoroethyelene, polyacrylonitrile, sulfonated polymer, carboxylated polymer, tetrafluoroethylene-perfluoro-3,6-dioxa-4-methyl-7-octenesulfonic acid copolymer, copolymers thereof, and combinations thereof.

In some of embodiments, the ion exchange material of the coated ion exchange particles comprises an oxide, a phosphate, an oxyfluoride, a fluorophosphate, or combinations thereof. In some embodiments, the ion exchange material of the coated ion exchange particles is selected from the group consisting of $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, and combinations thereof; wherein x is from 0.1-10; and y is from 0.1-10. In some embodiments, x is selected from 0.1, 0.2, 0.3, 0.4, 0.5, 0.6, 0.7, 0.8, 0.9, 1, 2, 3, 4, 5, 6, 7, 8, 9, and 10. In some embodiments, y is selected from 0.1, 0.2, 0.3, 0.4, 0.5, 0.6, 0.7, 0.8, 0.9, 1, 2, 3, 4, 5, 6, 7, 8, 9, and 10. In some embodiments, x and y are independently selected from 0.1, 0.2, 0.3, 0.4, 0.5, 0.6, 0.7, 0.8, 0.9, 1, 2, 3, 4, 5, 6, 7, 8, 9, and 10. In some embodiments, the ion exchange material of the coated ion exchange particles is selected from $Li_2SnO_3$, $Li_2MnO_3$, $Li_2TiO_3$, $Li_4Ti_5O_{12}$, $Li_4Mn_5O_{12}$, $Li_{1.6}Mn_{1.6}O_4$, and combinations thereof. In some embodiments, the ion exchange material of the coated ion exchange particles is $Li_4Mn_5O_{12}$.

In some embodiments, the uncoated ion exchange particles comprise an ion exchange material. In some embodiments, the ion exchange material of the uncoated ion exchange particles comprises an oxide, a phosphate, an oxyfluoride, a fluorophosphate, or combinations thereof. In some embodiments, the ion exchange material of the uncoated ion exchange particles is selected from the group consisting of $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_3VO_4$, $Li_2Si_3O_7$, $LiFePO_4$, $LiMnPO_4$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, and combinations thereof; wherein x is from 0.1-10; and y is from 0.1-10. In some embodiments, x is selected from 0.1, 0.2, 0.3, 0.4, 0.5, 0.6, 0.7, 0.8, 0.9, 1, 2, 3, 4, 5, 6, 7, 8, 9, and 10. In some embodiments, y is selected from 0.1, 0.2, 0.3, 0.4, 0.5, 0.6, 0.7, 0.8, 0.9, 1, 2, 3, 4, 5, 6, 7, 8, 9, and 10. In some embodiments, x and y are independently selected from 0.1, 0.2, 0.3, 0.4, 0.5, 0.6, 0.7, 0.8, 0.9, 1, 2, 3, 4, 5, 6, 7, 8, 9, and 10. In some embodiments, the ion exchange material of the uncoated ion exchange particles is selected from $Li_2SnO_3$, $Li_2MnO_3$, $Li_2TiO_3$, $Li_4Ti_5O_{12}$, $Li_4Mn_5O_{12}$, $Li_{1.6}Mn_{1.6}O_4$, and combinations thereof. In some embodiments, the ion exchange material of the uncoated ion exchange particles is $Li_4Mn_5O_{12}$.

In some embodiments, the matrix material comprises a polymer, an oxide, a phosphate, or combinations thereof. In some embodiments, the matrix material is selected from the group consisting of polyvinyl fluoride, polyvinylidene difluoride, polyvinyl chloride, polyvinylidene dichloride, polyethylene, polypropylene, polyphenylene sulfide, polytetrafluoroethylene, polytetrofluoroethylene, sulfonated polytetrofluoroethylene, polystyrene, polydivinylbenzene, polybutadiene, poly-ethylene-tetrafluoroethyelene, polyacrylonitrile, sulfonated polymer, carboxylated polymer, tetrafluoroethylene-perfluoro-3,6-dioxa-4-methyl-7-octenesulfonic acid copolymer, copolymers thereof, and combinations thereof.

In some embodiments, the filler material comprises a salt, a liquid, an organic material, or a combination of one or more thereof. In some embodiments, the filler material is a salt. In some embodiments, the filler material is a halide salt, a sulfate salt, a bisulfate salt, a carbonate salt, a bicarbonate salt, a nitrate salt, an alkali metal salt, an alkali earth metal salt, or combinations of one or more thereof. In some embodiments the halide salt is a chloride salt, a bromide salt, a fluoride salt, an iodide salt, or combinations thereof. In some embodiments, the filler material is an organic material. In some embodiments, the filler material is an organic material, wherein the organic material is a polymer or an organic liquid. In some embodiments, the filler material is a liquid. In some embodiments, the filler material is a liquid, wherein the liquid is an organic liquid, an aqueous liquid, or combinations thereof. In some embodiments, the filler material is a chloride salt, sodium chloride, a sulfate salt, a carbonate salt, a nitrate salt, an alkali metal salt, an alkali earth metal salt, an organic material, a polymer, an aqueous liquid, an organic liquid, a liquid mixture, or combinations thereof. In some embodiments, the filler material is sodium chloride.

In some embodiments, the liquid resource is selected from the following list: a natural brine, a dissolved salt flat, a geothermal brine, seawater, concentrated seawater, desalination effluent, a concentrated brine, a processed brine, liquid from an ion exchange process, liquid from a solvent extraction process, a synthetic brine, leachate from ores, leachate from minerals, leachate from clays, leachate from recycled products, leachate from recycled materials, or combinations thereof. In some embodiments, a liquid resource is selected from the following list: a natural brine, a dissolved salt flat, a concentrated brine, a processed brine, a synthetic brine, a geothermal brine, liquid from an ion exchange process, liquid from a solvent extraction process, leachate from minerals, leachate from clays, leachate from recycled products, leachate from recycled materials, or combinations thereof.

In some embodiments, the liquid resource is selected with a lithium concentration selected from the following list: less than 100,000 ppm, less than 10,000 ppm, less than 1,000 ppm, less than 100 ppm, less than 10 ppm, or combinations thereof. In some embodiments, a liquid resource is selected with a lithium concentration selected from the following list: less than 5,000 ppm, less than 500 ppm, less than 50 ppm, or combinations thereof.

In some embodiments, the acid used for recovering lithium from the porous ion exchange beads is selected from the following list: hydrochloric acid, sulfuric acid, phosphoric acid, hydrobromic acid, chloric acid, perchloric acid, nitric acid, formic acid, acetic acid, or combinations thereof. In some embodiments, the acid used for recovering lithium from the porous ion exchange beads is selected from the following list: hydrochloric acid, sulfuric acid, nitric acid, or combinations thereof.

In some embodiments, the acid used for recovering lithium from the porous ion exchange beads has a concentration selected from the following list: less than 0.1 M, less than 1.0 M, less than 5 M, less than 10 M, or combinations thereof. In some embodiments, lithium may be recovered from the porous ion exchange beads by exposing the beads to one acid and then exposing the beads to a second acid. In some embodiments, lithium may be recovered from the porous ion exchange beads by first adding an acid of a lower concentration or water, and then adding a more concentrated acid.

In some embodiments, the porous ion exchange beads perform the ion exchange reaction repeatedly over a number of cycles selected from the following list: greater than 10 cycles, greater than 30 cycles, greater than 100 cycles, greater than 300 cycles, greater than 1,000 cycles, or greater than 5,000 cycles. In some embodiments, the porous ion exchange beads perform the ion exchange reaction repeatedly over a number of cycles selected from the following list: greater than 100 cycles, greater than 300 cycles, or greater than 1,000 cycles.

In some embodiments, the concentrated lithium solution that is yielded from the porous ion exchange beads is further processed into lithium raw materials using methods selected from the following list: solvent extraction, ion exchange, chemical precipitation, electrolysis, electrodialysis, electrowinning, evaporation with direct solar energy, evaporation with concentrated solar energy, evaporation with a heat transfer medium heated by concentrated solar energy, evaporation with heat from a geothermal brine, evaporation with heat from combustion, reverse osmosis, nano-filtration, or combinations thereof.

In some embodiments, the concentrated lithium solution that is yielded from the porous ion exchange beads is further processed into lithium chemicals selected from the following list: lithium chloride, lithium carbonate, lithium hydroxide, lithium metal, lithium metal oxide, lithium metal phosphate, lithium sulfide, lithium sulfate, lithium phosphate, or combinations thereof. In some embodiments, the concentrated lithium solution that is yielded from the porous ion exchange beads is further processed into lithium chemicals that are solid, liquid, hydrated, or anhydrous.

In some embodiments, the lithium chemicals produced using the porous ion exchange beads are used in an industrial application selected from the following list: lithium batteries, metal alloys, glass, grease, or combinations thereof. In some embodiments, the lithium chemicals produced using the coated ion exchange particles are used in an application selected from the following list: lithium batteries, lithium-ion batteries, lithium sulfur batteries, lithium solid-state batteries, and combinations thereof.

In some embodiments, the ion exchange materials are synthesized in a lithiated state with a sublattice fully or partly occupied by lithium. In some embodiments, the ion exchange materials are synthesized in a hydrated state with a sublattice fully or partly occupied by hydrogen.

An aspect described herein is a method of extracting lithium from a liquid resource, comprising: (a) contacting a porous ion exchange bead comprising ion exchange material and a matrix material, wherein the porous ion exchange bead is prepared by a process comprising the steps of: (i) combining the ion exchange material and the matrix material with a filler material to produce a precursor bead; and (ii) removing the filler material, with a liquid resource to produce a lithiated porous ion exchange bead; and (b) treating the lithiated porous ion exchange bead with an acid solution to produce a salt solution comprising lithium ions.

In some embodiments of the methods described herein, the liquid resource is a natural brine, a dissolved salt flat, seawater, concentrated seawater, a desalination effluent, a concentrated brine, a processed brine, waste brine from a bromine-extraction process, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments of the methods described herein, the liquid resource is a brine. In some embodiments of the methods described herein, the liquid resource comprises a natural brine, a synthetic brine, or a mixture of a natural and a synthetic brine. In some embodiments of the methods described herein, the liquid resource is a natural brine, a dissolved salt flat, seawater, concentrated seawater, a desalination effluent, a concentrated brine, a processed brine, waste brine from a bromine-extraction process, an oilfield brine, a liquid from an ion exchange process, or combinations thereof.

In some embodiments of the methods described herein, the acid solution comprises hydrochloric acid, sulfuric acid, phosphoric acid, hydrobromic acid, chloric acid, perchloric acid, nitric acid, formic acid, acetic acid, or combinations thereof. In some embodiments of the methods described herein, the acid solution comprises hydrochloric acid, sulfuric acid, phosphoric acid, nitric acid, or combinations thereof. In some embodiments of the methods described herein, the acid solution comprises hydrochloric acid, sulfuric acid, phosphoric acid, or combinations thereof. In some embodiments of the methods described herein the acid solution comprises hydrochloric acid. In some embodiments of the methods described herein the acid solution comprises sulfuric acid. In some embodiments of the methods described herein the acid solution comprises phosphoric acid.

In some embodiments, the method is conducted in a column, a vessel, or a stirred tank reactor. In some embodiments the method is conducted in a vessel. In some embodiments the method is conducted in a vessel, wherein the vessel is a stirred tank or a column. In some embodiments, the method is conducted in a plurality of vessels. In some embodiments, the method is conducted in a plurality of vessels that are in fluid communication with each other. In some embodiments, one or more of the plurality of vessels is a column and one or more of the plurality of vessels is a stirred tank.

EXAMPLES

Example 1: Porous Ion Exchange Beads with PVC Matrix

Lithium is extracted from a brine using porous ion exchange beads. The brine is an aqueous chloride solution containing 100 ppm Li, 40,000 ppm Na, 30,000 ppm Ca, and 3,000 ppm Mg. The porous ion exchange beads are comprised of ion exchange particles and a polymer matrix. The ion exchange particles are comprised of a $Li_4Mn_5O_{12}$ core with a $ZrO_2$ coating. The ion exchange particles contain 99 wt % $Li_4Mn_5O_{12}$ and 1 wt % $ZrO_2$. The particles are approximately spherical with a mean diameter of 1.0 microns, and the coating thickness is approximately 1 nm. The polymer matrix is comprised of PVC. The porous beads contain pores with a distribution of pore sizes providing diffusion channels from the bead surface into the bead interior and to the ion exchange particles. When the porous beads are submerged in aqueous or other solutions, the pores are infiltrated with the solutions. The beads have a distribution of shapes that are approximately spherical on average with a 1.0 mm average diameter.

The porous ion exchange beads are created by combining three components: ion exchange particles, a polymer, and a removable filler material. The filler material is potassium sulfate. The three components are mixed together using a solvent mixture of n-methyl-2-pyrrolidone, ethanol, and water, and then the solvent is removed. The resulting mixture is ground and formed into beads using a mechanical press. The beads are heated to alter the structure of the polymer and improve mechanical strength. The filler is removed using water, which dissolves the filler and thereby leaves behind pores throughout the bead. The bead is heated again to alter the structure of the polymer and further improve mechanical strength.

The porous beads are treated with HCl acid to yield LiCl in solution. 1.0 g of the beads are stirred in 30 mL of 1.0 M HCl acid for 4 hours at room temperature. The pores in the beads allow the acid solution to penetrate into the bead and access the ion exchange particles. Therefore, the ion exchange particles can absorb hydrogen from the acid while releasing lithium into the acid. The Li4Mn5O12 active material is converted to a hydrogenated state with a hydrogen-rich composition $Li_{4-x}H_xMn_5O_{12}$ where x may be close to 4. The $ZrO_2$ coating allows diffusion of hydrogen and lithium respectively to and from the active material while providing a protective barrier that limits dissolution of manganese and oxygen from the active material. After 4 hours of stirring, the solution is collected for elemental analysis to measure lithium yield.

After treatment in acid, the hydrogenated beads are treated with brine wherein the particles absorb lithium while releasing hydrogen. The hydrogenated beads are stirred in 1.0 L of brine for 4 hours at room temperature. The pores in the beads allow the brine solution to penetrate into the bead and access the ion exchange particles. Therefore, the ion exchange particles can absorb lithium from the brine while releasing hydrogen into the brine. The beads are converted from a hydrogenated state to a lithiated state with a lithium-rich composition $Li_{4-x}H_xMn_5O_{12}$ where x may be close to 0. After 4 hours of stirring, the solution is collected for elemental analysis to measure lithium uptake.

The lithiated beads are then treated again with acid to yield lithium in solution as described previously. The cycle of hydrogenation and lithiation is repeated to extract lithium from the brine and yield a LiCl solution. The pores in the beads facilitate penetration of the acid and brine solutions into the beads, facilitating absorption and release of lithium and hydrogen by the ion exchange particle. Dissolution and degradation of the active material in acid is limited due to the $ZrO_2$ coating providing a protective barrier. Dissolution of the active material is measured with elemental analysis of the acid solution following stirring.

Example 2: Ion Exchange Column with Fixed Bed of Porous Beads

Lithium is extracted from a brine using an ion exchange column loaded with a fixed bed of porous ion exchange particles. The brine is a natural chloride solution containing approximately 100 ppm Li, 40,000 ppm Na, 30,000 ppm Ca, and 3,000 ppm Mg. The porous ion exchange beads are comprised of ion exchange particles and a polymer matrix. The ion exchange particles are comprised of a $Li_4Mn_5O_{12}$ core with a $ZrO_2$ coating. The ion exchange particles contain 99 wt % $Li_4Mn_5O_{12}$ and 1 wt % $ZrO_2$. The particles are approximately spherical with a mean diameter of 1.0 microns, and the coating thickness is approximately 1.0 nm. The polymer matrix is comprised of PVC. The porous beads contain pores with a distribution of pore sizes providing diffusion channels from the bead surface into the bead interior and to the ion exchange particles. When the porous beads are submerged in aqueous or other solutions, the pores are infiltrated with the solutions. The beads have a distribution of shapes that are approximately spherical on average with a 1.0 mm average diameter.

The porous ion exchange beads are created by combining three components: ion exchange particles, a polymer, and a removable filler material. The filler material is potassium sulfate. The three components are mixed together using a solvent mixture of n-methyl-2-pyrrolidone, ethanol, and water, and then the solvent is removed. The resulting mixture is ground and formed into beads using a mechanical press. The beads are heated to alter the structure of the polymer and improve mechanical strength. The filler is removed using water, which dissolves the filler and thereby leaves behind pores throughout the bead. The bead is heated again to alter the structure of the polymer and further improve mechanical strength.

The ion exchange column is 3.0 meters in length and 1.0 meters in diameter. The column is loaded with a fixed bed of porous beads. 1.0 M HCl acid is pumped into the bottom of the column at a flow rate of 0.5 bed volumes per hour to elute a LiCl solution out the top of the column. The pores in the beads allow the acid solution to penetrate into the bead and access the ion exchange particles. Therefore, the ion exchange particles can absorb hydrogen from the acid while releasing lithium into the acid. The $Li_4Mn_5O_{12}$ active material is converted to a hydrogenated state with a hydrogen-rich composition $Li_{4-x}H_xMn_5O_{12}$ where x may be close to 2. The $ZrO_2$ coating allows diffusion of hydrogen and lithium respectively to and from the active material while providing a protective barrier that limits dissolution of manganese and oxygen from the active material. The beads release lithium to yield a LiCl solution with a lithium concentration of approximately 0.8 M in solution. Lithium recovery from the column is monitored using pH measurements and elemental analysis. After lithium recovery, the column is flushed with water.

Next, brine is pumped down through the column at a flow rate of 3.0 bed volumes per hour. The beads absorb lithium while releasing hydrogen. The pores in the beads allow the brine solution to penetrate into the bead and access the ion exchange particles. Therefore, the ion exchange particles can absorb lithium from the brine while releasing hydrogen into the brine. The beads are converted from a hydrogenated state to a lithiated state with a lithium-rich composition $Li_4Mn_5O_{12}$ where x may be close to 0. Lithium uptake by the beads in the column is monitored using pH measurements and elemental analysis. The brine exiting the column is adjusted to a neutral pH using NaOH and then reinjected into a brine reservoir. After lithium uptake, the column is flushed with water.

The column is operated by repeating the previously described steps of acid and brine pumping in alternation. This column operation functions to extract lithium from the brine and produce a concentrated LiCl solution. During column operation, the porous beads allow the acid and brine solutions to penetrate into the beads and deliver hydrogen and lithium to the ion exchange particles. The ion exchange particles are protected from dissolution and degradation due to the $ZrO_2$ surface coating, which provides a protective barrier.

The LiCl solution that is yielded from column operation is processed into lithium raw materials including $Li_2CO_3$, LiOH, LiCl and Li metal. These lithium raw materials are sold for use in batteries, alloys, and other products.

Example 3: Porous Ion Exchange Beads with PVDF Matrix

Lithium was extracted from a brine using porous ion exchange beads. The brine was an aqueous chloride solution containing 500 ppm Li, 60,000 ppm Na, 17,000 ppm Ca, and 3,000 ppm Mg. The porous ion exchange beads are comprised of ion exchange particles and a polymer matrix. The ion exchange particles were comprised of a $Li_4Mn_5O_{12}$ core with a $SiO_2$ coating. The particles were approximately spherical with a mean diameter of 40 microns, and the coating thickness was approximately 2 microns. The polymer matrix was comprised of polyvinylidene difluoride (PVDF). The porous beads contained pores with a distribution of pore sizes providing diffusion channels from the bead surface into the bead interior and to the ion exchange particles. When the porous beads were submerged in aqueous or other solutions, the pores were infiltrated with the solutions. The beads had a distribution of shapes that are approximately spherical on average with a 800 micron average diameter.

The porous ion exchange beads were created by combining three components: the ion exchange particles, PVDF polymer, and a removable filler material. The filler material was finely ground sodium chloride. The three components were mixed together using a dry mixer. The resulting mixture was compacted into beads and fired at a temperature of 190 Celcius to alter the structure of the polymer and improve mechanical strength. The filler was then removed using water, which dissolved the filler and thereby left behind pores throughout the beads. The beads were heated again to alter the structure of the polymer and further improve mechanical strength.

The porous beads were treated with HCl acid to yield LiCl in solution. 1.0 g of the beads were stirred in 30 mL of 1.0 M HCl acid for 1 hour at room temperature. The pores in the beads allowed the acid solution to penetrate into the bead and access the ion exchange particles. Therefore, the ion exchange particles absorbed protons from the acid while releasing lithium into the acid solution. The $Li_4Mn_5O_{12}$ active material was converted to a protonated state with a hydrogen-rich composition $Li_{4-x}H_xMn_5O_{12}$ where x was close to 4. The $SiO_2$ coating allowed diffusion of hydrogen and lithium respectively to and from the active material while providing a protective barrier that limited dissolution of manganese and oxygen from the active material. After 4 hours of stirring, the solution was collected for elemental analysis to measure lithium yield.

After treatment in acid, the protonated beads were treated with brine wherein the particles absorbed lithium while releasing protons. The protonated beads were stirred in 200 mL of brine for 4 hours at room temperature. The pores in the beads allowed the brine solution to penetrate into the bead and access the ion exchange particles. The ion exchange particles absorbed lithium from the brine while releasing protons into the brine. A pH modulating setup was used to measure the pH of the brine and add a solution of NaOH to neutralize the protons released by the beads. The beads were converted from a protonated state to a lithiated state with a lithium-rich composition $Li_{4-x}H_xMn_5O_{12}$ where x was approximately 0.5. After 4 hours of stirring, the solution was collected for elemental analysis to measure lithium uptake.

The lithiated beads were then treated again with acid to yield lithium in solution as described previously. The cycle of protonation and lithiation was repeated to extract lithium from the brine and yield a LiCl solution. The pores in the beads facilitated penetration of the acid and brine solutions into the beads, facilitating absorption and release of lithium and protons by the ion exchange particle. Dissolution and degradation of the active material in acid was limited due to the $SiO_2$ coating providing a protective barrier. Dissolution of the active material was measured with elemental analysis of the acid solution following stirring.

Example 4: Porous Ion Exchange Beads with Polystyrene Matrix

Lithium was extracted from a brine using porous ion exchange beads. The brine was an aqueous chloride solution containing approximately 100 ppm Li. The porous ion exchange beads were comprised of ion exchange particles and a polymer matrix. The ion exchange particles were comprised of a $Li_4Mn_5O_{12}$. The particles were granular with an average characteristic size of approximately 120 microns. The polymer matrix was comprised of polystyrene. The beads contained 90 wt % ion exchange particles and 10 wt % polymer matrix. The porous beads contained pores with a distribution of pore sizes providing diffusion channels from the bead surface into the bead interior and to the ion exchange particles. When the porous beads were submerged in aqueous or other solutions, the pores were infiltrated with the solutions.

The porous ion exchange beads were created by mixing polystyrene powder in acetone to partly dissolve the polystyrene. Then, the acetone-polystyrene mixture was mixed with the ion exchange particles. The mixture was then heated to remove the acetone, creating a porous mass. The removal of the acetone left behind pores that allowed for diffusion of lithium ions and protons into the porous structure. The porous mass was then ground into granules approximately 300 microns in size.

The porous beads were stirred for 1 hour with 0.75 N HCl acid to yield LiCl in solution. The pores in the beads allowed the acid solution to penetrate into the bead and access the ion exchange particles. Therefore, the ion exchange particles absorbed protons from the acid while releasing lithium into the acid solution.

After treatment in acid, the protonated beads were treated with brine wherein the particles absorbed lithium while releasing protons. The protonated beads were stirred in brine for 4 hours at room temperature. The pores in the beads allowed the brine solution to penetrate into the bead and access the ion exchange particles. The ion exchange particles absorbed lithium from the brine while releasing protons into the brine. A pH modulating setup was used to measure the pH of the brine and add a solution of NaOH to neutralize the protons released by the beads.

The lithiated beads were then treated again with acid to yield lithium in solution as described previously. The cycle of protonation and lithiation was repeated to extract lithium from the brine and yield a LiCl solution. The pores in the beads facilitated penetration of the acid and brine solutions into the beads, facilitating absorption and release of lithium and protons by the ion exchange particle.

Example 5: Lithium Extraction Using Porous Ion Exchange Beads in a Stirred Tank Reactor with a Porous Mesh Compartment Lithium is extracted from a brine using porous ion exchange beads. The brine is an aqueous chloride solution containing approximately 300 ppm Li. The porous ion exchange beads are comprised of ion exchange particles and a polymer matrix. The ion exchange particles are comprised of a $Li_4Mn_5O_{12}$. The particles are granular with an average characteristic size of approximately 40 microns. The polymer matrix is comprised of polyvinylidene difluoride (PVDF). The beads contain approximately 80 wt % ion exchange particles and 20 wt % PVDF. The porous beads contain pores with a distribution of pore sizes providing diffusion channels from the bead surface into the bead interior and to the ion exchange particles. When the porous beads are submerged in aqueous or other solutions, the pores are infiltrated with the solutions. The beads have a distribution of shapes that are approximately spherical on average with an 80 micron average diameter.

The porous ion exchange beads are created by dry-mixing PVDF powder with the ion exchange particles and finely ground sodium chloride. The mixture is pressed into beads and is then heated to 200 C to melt the PVDF. Then the beads are washed with water to remove the sodium chloride and create a porous bead.

Figure 4:
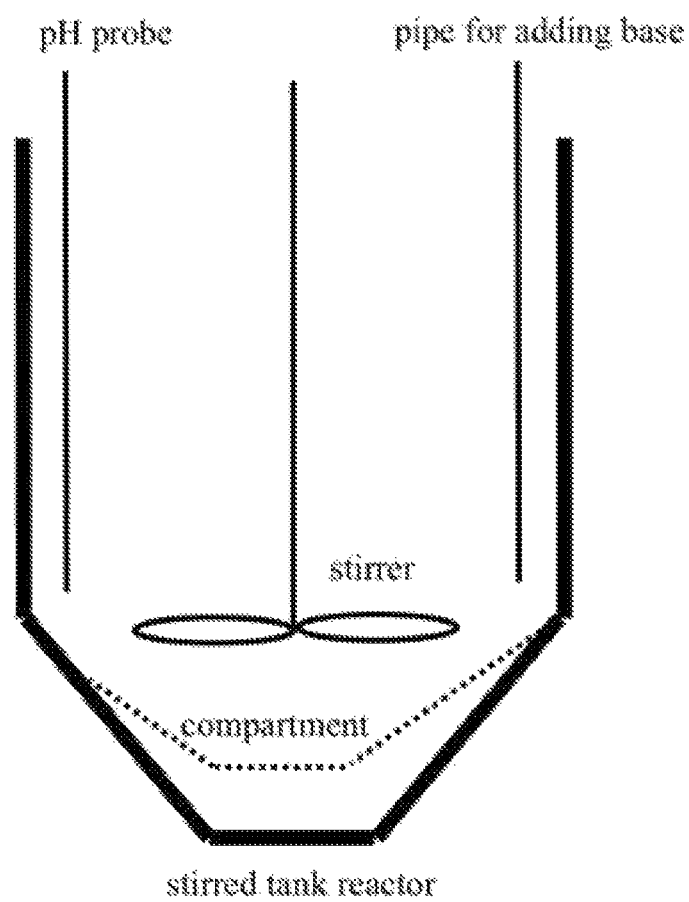
FIG. 4 depicts a stirred tank reactor comprising a compartment for containing porous beads in the compartment while allowing solutions to drain out of the bottom of the compartment and out of the bottom of the stirred tank reactor.

The porous beads are loaded into a stirred tank reactor containing a compartment formed with a porous polymer mesh at the bottom of the compartment that contains the beads in the stirred tank reactor while allowing fluids to drain out of the bottom of the tank (FIG. 4). The compartment is open on the top and contains approximately 99% of the volume of the stirred tank reactor. The beads are stirred for 1 hour with 0.75 N HCl acid to yield LiCl in solution. The pores in the beads allow the acid solution to penetrate into the bead and access the ion exchange particles. Therefore, the ion exchange particles absorb protons from the acid while releasing lithium into the acid solution. The acid solution is drained out of the bottom of the stirred tank reactors while the porous beads are contained above the porous mesh.

After treatment in acid, the protonated beads are treated with brine wherein the particles absorb lithium while releasing protons. The protonated beads are stirred in brine for 4 hours at room temperature. The pores in the beads allow the brine solution to penetrate into the bead and access the ion exchange particles. The ion exchange particles absorb lithium from the brine while releasing protons into the brine. A pH modulating setup is used to measure the pH of the brine and add a solution of NaOH to neutralize the protons released by the beads.

The lithiated beads are then treated again with acid to yield lithium in solution as described previously. The cycle of protonation and lithiation is repeated to extract lithium from the brine and yield a LiCl solution. The pores in the beads facilitate penetration of the acid and brine solutions into the beads, facilitating absorption and release of lithium and protons by the ion exchange particle.

Example 6: Lithium Extraction Using Porous Ion Exchange Beads in a Column

Lithium was extracted from a brine using an ion exchange column loaded with a fixed bed of porous ion exchange particles. The brine was a natural chloride solution containing approximately 100 ppm Li with other chloride salts near saturation. The porous ion exchange beads were comprised of ion exchange particles and a polymer matrix. The ion exchange particles were comprised of a $Li_4Mn_5O_{12}$ with a radius of approximately 40 microns. The polymer matrix is comprised of polyvinylidene difluoride (PVDF). The porous beads were formed by dry mixing PVDF powder with the ion exchange particles and finely ground sodium chloride. The mixture was heated to 180 C to melt the PVDF and form a polymer matrix to hold the bead together. The mixture then formed a bulk composite, which was reduced in size to form beads with irregular shape that were approximately 1 mm in size. Then, the sodium chloride was washed from the composite to form a porous structure facilitating diffusion of fluids into the beads. The porous beads contained pores with a distribution of pore sizes providing diffusion channels from the bead surface into the bead interior and to the ion exchange particles. When the porous beads were submerged in aqueous or other solutions, the pores were infiltrated with the solutions. The beads had a distribution of shapes with a typical size of approximately 1 mm.

The ion exchange column was 0.5 meters in length and 0.5 inches in diameter. The column was loaded with a fixed bed of porous beads. 1.0 M HCl acid was pumped into the bottom of the column to elute a LiCl solution out the top of the column. The pores in the beads allowed the acid solution to penetrate into the bead and access the ion exchange particles. Therefore, the ion exchange particles absorbed protons from the acid while releasing lithium into the acid. After elution, the column was flushed with water.

Next, brine was pumped down through the column. The beads absorbed lithium while releasing hydrogen. The pores in the beads allowed the brine solution to penetrate into the beads and access the ion exchange particles. Therefore, the ion exchange particles absorbed lithium from the brine while releasing protons into the brine. The beads were converted from a protonated state to a lithiated state. Lithium uptake by the beads in the column was monitored using pH measurements and elemental analysis. After lithium uptake, the column was flushed with water.

The column was operated by repeating the previously described steps of acid and brine pumping in alternation. This column operation functioned to extract lithium from the brine and produce a concentrated LiCl solution. During column operation, the porous beads allowed the acid and brine solutions to penetrate into the beads and deliver hydrogen and lithium to the ion exchange particles.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of making porous ion exchange beads, comprising:
   (a) combining and mixing i) ion exchange particles that reversibly exchange lithium with hydrogen, ii) a matrix material, and iii) a filler material to make a mixture;
   (b) forming the mixture into beads;
   (c) optionally heating the beads; and
   (d) removing the filler material to make porous ion exchange beads.

2. The method of claim 1, wherein the combining and mixing at step (a) comprises mixing the ion exchange particles, matrix material, filler material, or combinations thereof as dry powders.

3. The method of claim 1, wherein the combining and mixing at step (a) comprises using one or more solvents, wherein the mixture is a slurry.

4. The method of claim 1, wherein the heating at step (c) melts or sinters the matrix material.

5. The method of claim 1, wherein the removing at step (d) comprises dissolving the filler material using water, an aqueous solution, an acid, a brine, an alcohol, acetone, or combinations thereof.

6. The method of claim 1, wherein the removing at step (d) comprises heating the beads so as to remove the filler material through sublimation or evaporation, or to decompose the filler material to decomposition products.

7. The method of claim 1, wherein the ion exchange particles comprise coated ion exchange particles, uncoated ion exchange particles, or combinations thereof.

8. The method of claim 7, wherein the coated ion exchange particles comprise an ion exchange material and a coating material.

9. The method of claim 8, wherein the coating material of the coated ion exchange particles is selected from the group consisting of: a carbide, a nitride, an oxide, a phosphate, a fluoride, a polymer, carbon, a carbonaceous material, and a combination thereof.

10. The method of claim 9, wherein the coating material of the coated ion exchange particles is selected from the group consisting of: $TiO_2$, $ZrO_2$, $MoO_2$, $SnO_2$, $Nb_2O_5$, $Ta_2O_5$, $SiO_2$, $Li_2TiO_3$, $Li_2ZrO_3$, $Li_2SiO_3$, $Li_2MnO_3$, $Li_2MoO_3$, $LiNbO_3$, $LiTaO_3$, $AlPO_4$, $LaPO_4$, $ZrP_2O_7$, $MoP_2O_7$, $Mo_2P_3O_{12}$, $BaSO_4$, $AlF_3$, $SiC$, $TiC$, $ZrC$, $Si_3N_4$, $ZrN$, $BN$, carbon, graphitic carbon, amorphous carbon, hard carbon, diamond-like carbon, solid solutions thereof, and a combination thereof.

11. The method of claim 9, wherein the coating material of the coated ion exchange particles is selected from the group consisting of: polyethylene, low density polyethylene, high density polyethylene, polypropylene, polyphenylene sulfide, polyester, polytetrafluoroethylene, types of polyamide, polyether ether ketone, polysulfone, polyvinylidene difluoride, poly (4-vinyl pyridine-co-styrene), polystyrene, polybutadiene, acrylonitrile butadiene styrene, polyvinyl chloride, polyvinylidene dichloride, ethylene tetrafluoroethylene polymer, poly(chlorotrifluoroethylene), ethylene chlorotrifluoro ethylene, polyvinyl fluoride, fluorinated ethylene-propylene, perfluorinated elastomer, chlorotrifluoroethylenevinylidene fluoride, perfluoropolyether, perfluorosulfonic acid, polyethylene oxide, polyethylene glycol, sodium polyacrylate, polyethylene-block-poly (ethylene glycol), polyacrylonitrile, polychloroprene (neoprene), polyvinyl butyral, expanded polystyrene, polydivinylbenzene, tetrafluoroethylene-perfluoro-3,6-dioxa-4-methyl-7-octenesulfonic acid copolymer, copolymers thereof, and a combination thereof.

12. The method of claim 8, wherein the coated ion exchange particles and the uncoated ion exchange particles independently comprise ion exchange material that is selected from the group consisting of: an oxide, a phosphate, an oxyfluoride, a fluorophosphate, and a combination thereof.

13. The method of claim 8, wherein the coated ion exchange particles and the uncoated ion exchange particles independently comprise ion exchange material that is selected from the group consisting of: $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, and a combination thereof; wherein x is from 0.1-10; and y is from 0.1-10.

14. The method of claim 1, wherein the matrix material is selected from the group consisting of: a polymer, an oxide, a phosphate, and a combination thereof.

15. The method of claim 14, wherein the matrix material is selected from the group consisting of: polyvinyl fluoride, polyvinylidene difluoride, polyvinyl chloride, polyvinylidene dichloride, polyethylene, polypropylene, polyphenylene sulfide, polytetrafluoroethylene, sulfonated polytetrafluoroethylene, polystyrene, polydivinylbenzene, polybutadiene, poly-ethylene-tetrafluoroethyelene, polyacrylonitrile, sulfonated polymer, carboxylated polymer, tetrafluoroethylene-perfluoro-3,6-dioxa-4-methyl-7-octene-sulfonic acid copolymer, copolymers thereof, and a combination thereof.

16. The method of claim 1, wherein the filler material is selected from the group consisting of: a salt, a chloride salt, sodium chloride, a sulfate salt, a carbonate salt, a nitrate salt, an alkali metal salt, an alkali earth metal salt, an organic material, a polymer, an aqueous liquid, an organic liquid, a liquid mixture, and a combination thereof.

17. The method of claim 1, wherein the filler material is removed at step (d) by sublimation or evaporation by subjecting the beads to heat, vacuum, air, or combinations thereof.

18. The method of claim 1, wherein the porous ion exchange beads have an average diameter of greater than about 100 μm and less than about 1000 μm.

\* \* \* \* \*